United States Patent
Miasnik et al.

(10) Patent No.: US 9,805,430 B2
(45) Date of Patent: Oct. 31, 2017

(54) CRISIS-RELATED INFORMATION EXCHANGE HUB

(71) Applicant: AtHoc, Inc., San Mateo, CA (US)

(72) Inventors: Guy Miasnik, Mountain View, CA (US); Aviv Siegel, San Mateo, CA (US); Itzhak Ziv, Boulder, CO (US); Sanjay Saini, San Jose, CA (US)

(73) Assignee: AtHoc, Inc., San Mateo, CA (US)

( * ) Notice: Subject to any disclaimer, the term of this patent is extended or adjusted under 35 U.S.C. 154(b) by 71 days.

(21) Appl. No.: 14/541,073

(22) Filed: Nov. 13, 2014

(65) Prior Publication Data

US 2015/0269702 A1 Sep. 24, 2015

Related U.S. Application Data

(63) Continuation of application No. 14/223,054, filed on Mar. 24, 2014, now abandoned.

(51) Int. Cl.
| | |
|---|---|
| *G06Q 10/10* | (2012.01) |
| *G06Q 30/02* | (2012.01) |
| *G06Q 40/08* | (2012.01) |
| *G06Q 10/08* | (2012.01) |
| *G06Q 50/26* | (2012.01) |
| *G06Q 10/00* | (2012.01) |

(52) U.S. Cl.
CPC ........... *G06Q 50/265* (2013.01); *G06Q 10/00* (2013.01)

(58) Field of Classification Search
CPC .............................. G06Q 10/10; G06Q 50/265
USPC .................................................. 705/1.1–912
See application file for complete search history.

(56) References Cited

U.S. PATENT DOCUMENTS

| | | |
|---|---|---|
| 5,369,763 A | 11/1994 | Biles |
| 5,862,325 A | 1/1999 | Reed et al. |
| 5,878,406 A | 3/1999 | Noyes |
| 6,058,389 A | 5/2000 | Chandra et al. |

(Continued)

OTHER PUBLICATIONS

Barnes, R. et al., "Technical Considerations for Next-Generation 911," IETF, 2011, 29 pages.

(Continued)

*Primary Examiner* — Jonathan Ouellette
(74) *Attorney, Agent, or Firm* — Fish & Richardson P.C.

(57) ABSTRACT

A crisis-related information hub manages the exchange of crisis-related information among multiple individual users and organizations. A safety communications service (SCS) manages information flow between users and organizations without compromising the security of the private networks of organizations protected by firewalls. The SCS manages relationship data for controlling what information is received by particular users and organizations, providing subscription services including relationship generation services based on configurable business rules. User-initiated communications are routed to multiple organizations and/or other users based on configurable business rules using user and organization attributes. Organization-initiated communications are routed to individual users or organizations based on configurable business rules using user and organization attributes. The system automatically generates follow-up communications related to the acknowledgement of receipt of communications or prompts users for additional information if an expected communication was not received in a timely manner or is not fully responsive to prior communications.

25 Claims, 14 Drawing Sheets

(56) References Cited

U.S. PATENT DOCUMENTS

| | | |
|---|---|---|
| 6,112,181 A | 8/2000 | Shear et al. |
| 6,158,903 A | 12/2000 | Schaeffer et al. |
| 6,345,288 B1 | 2/2002 | Reed et al. |
| 6,400,265 B1 | 6/2002 | Saylor et al. |
| 7,113,090 B1 | 9/2006 | Saylor et al. |
| 7,221,928 B2 | 5/2007 | Laird et al. |
| 7,233,781 B2 | 6/2007 | Hunter et al. |
| 7,301,450 B2 | 11/2007 | Carrino |
| 7,711,094 B1 | 5/2010 | Olshansky et al. |
| 7,973,655 B2 | 7/2011 | Blinnikka et al. |
| 7,979,094 B2 | 7/2011 | Whattam |
| 8,095,610 B2 | 1/2012 | Gould et al. |
| 8,125,328 B2 | 2/2012 | Sartini et al. |
| 8,145,183 B2 | 3/2012 | Barbeau et al. |
| 8,224,284 B2 | 7/2012 | Foladare et al. |
| 8,234,128 B2 | 7/2012 | Martucci et al. |
| 8,280,364 B1 | 10/2012 | Sennett et al. |
| 8,380,162 B2 | 2/2013 | Matsuo et al. |
| 8,380,429 B2 | 2/2013 | Nortrup |
| 8,385,964 B2 | 2/2013 | Haney |
| 8,396,002 B2 | 3/2013 | Marshall-Wilson |
| 8,401,154 B2 | 3/2013 | Boni et al. |
| 8,412,147 B2 | 4/2013 | Hunter et al. |
| 8,520,072 B1 | 8/2013 | Slavin et al. |
| 8,533,612 B2 | 9/2013 | Hochendoner et al. |
| 8,538,458 B2 | 9/2013 | Haney |
| 8,542,117 B1 | 9/2013 | Miasnik et al. |
| 8,583,076 B2 | 11/2013 | Foladare et al. |
| 8,675,071 B1 | 3/2014 | Slavin et al. |
| 8,699,672 B1 | 4/2014 | Schumacher |
| 8,750,898 B2 | 6/2014 | Haney |
| 8,787,871 B2 | 7/2014 | Givens et al. |
| 8,798,593 B2 | 8/2014 | Haney |
| 8,798,645 B2 | 8/2014 | Haney |
| 8,798,647 B1 | 8/2014 | Haney |
| 8,810,657 B1 | 8/2014 | Slavin et al. |
| 8,831,635 B2 | 9/2014 | Haney |
| 8,843,105 B2 | 9/2014 | Fan et al. |
| 8,848,879 B1 | 9/2014 | Coughlan et al. |
| 8,849,359 B2 | 9/2014 | Whattam |
| 8,855,905 B1 | 10/2014 | Nortrup |
| 8,862,393 B2 | 10/2014 | Zhou et al. |
| 8,881,040 B2 | 11/2014 | Li |
| 8,923,803 B2 | 12/2014 | Ray |
| 2001/0037364 A1 | 11/2001 | Michalek et al. |
| 2002/0143469 A1 | 10/2002 | Alexander et al. |
| 2003/0004693 A1 | 1/2003 | Neiman et al. |
| 2003/0004965 A1 | 1/2003 | Farmer et al. |
| 2003/0125998 A1 | 7/2003 | McKenney et al. |
| 2004/0015294 A1 | 1/2004 | Kirtland |
| 2004/0023635 A1 | 2/2004 | Impson et al. |
| 2004/0029564 A1 | 2/2004 | Hodge |
| 2004/0203568 A1 | 10/2004 | Kirtland |
| 2005/0043014 A1 | 2/2005 | Hodge |
| 2005/0055245 A1 | 3/2005 | Oster et al. |
| 2005/0085257 A1 | 4/2005 | Laird et al. |
| 2005/0091368 A1 | 4/2005 | Ozburn |
| 2005/0190053 A1 | 9/2005 | Dione |
| 2005/0197894 A1 | 9/2005 | Fairbanks et al. |
| 2005/0245232 A1 | 11/2005 | Jakober et al. |
| 2005/0264425 A1 | 12/2005 | Sato et al. |
| 2005/0278365 A1 | 12/2005 | Boucousis |
| 2006/0009992 A1 | 1/2006 | Cwiek et al. |
| 2006/0085374 A1 | 4/2006 | Mayes et al. |
| 2006/0108241 A1 | 5/2006 | Smith |
| 2006/0224797 A1 | 10/2006 | Parish et al. |
| 2007/0040895 A1 | 2/2007 | Barbeau et al. |
| 2007/0190968 A1 | 8/2007 | Dickinson et al. |
| 2007/0269023 A1 | 11/2007 | Klauer et al. |
| 2007/0275690 A1 | 11/2007 | Hunter et al. |
| 2007/0282959 A1 | 12/2007 | Stern |
| 2007/0297589 A1 | 12/2007 | Greischar et al. |
| 2008/0010004 A1 | 1/2008 | Small et al. |
| 2008/0032666 A1 | 2/2008 | Hughes et al. |
| 2008/0032703 A1 | 2/2008 | Krumm et al. |
| 2008/0046285 A1 | 2/2008 | Greischar et al. |
| 2008/0118039 A1 | 5/2008 | Elliot et al. |
| 2008/0186166 A1 | 8/2008 | Zhou et al. |
| 2008/0189162 A1 | 8/2008 | Ganong et al. |
| 2008/0189360 A1 | 8/2008 | Kiley et al. |
| 2008/0221965 A1 | 9/2008 | Riddle |
| 2008/0266079 A1 | 10/2008 | Lontka |
| 2009/0040042 A1 | 2/2009 | Lontka |
| 2009/0042533 A1 | 2/2009 | Lontka |
| 2009/0128359 A1 | 5/2009 | Whattam |
| 2009/0164665 A1 | 6/2009 | Foote et al. |
| 2009/0248828 A1 | 10/2009 | Gould et al. |
| 2009/0254971 A1 | 10/2009 | Herz et al. |
| 2010/0003958 A1 | 1/2010 | Ray et al. |
| 2010/0023156 A1 | 1/2010 | Trepina et al. |
| 2010/0029243 A1 | 2/2010 | Ozer et al. |
| 2010/0048159 A1 | 2/2010 | Stenquist |
| 2010/0069115 A1 | 3/2010 | Liu |
| 2010/0136945 A1 | 6/2010 | Givens et al. |
| 2010/0214090 A1 | 8/2010 | Sartini et al. |
| 2010/0262668 A1 | 10/2010 | Piett et al. |
| 2011/0064205 A1 | 3/2011 | Boni et al. |
| 2011/0069172 A1 | 3/2011 | Hazzani |
| 2011/0095881 A1 | 4/2011 | Rosentel et al. |
| 2011/0117878 A1 | 5/2011 | Barash et al. |
| 2011/0169634 A1 | 7/2011 | Raj et al. |
| 2011/0212700 A1 | 9/2011 | Petite |
| 2011/0234394 A1 | 9/2011 | Whattam |
| 2011/0260833 A1 | 10/2011 | Lemmon |
| 2011/0275388 A1 | 11/2011 | Haney |
| 2011/0282890 A1 | 11/2011 | Griffith |
| 2012/0066345 A1 | 3/2012 | Rayan et al. |
| 2012/0071129 A1 | 3/2012 | Haney |
| 2012/0126976 A1 | 5/2012 | Bugenhagen |
| 2012/0171989 A1 | 7/2012 | Matsuo et al. |
| 2012/0179421 A1 | 7/2012 | Dasgupta |
| 2012/0185897 A1 | 7/2012 | Gould et al. |
| 2012/0226526 A1 | 9/2012 | Donovan et al. |
| 2012/0250832 A1 | 10/2012 | Foladare et al. |
| 2012/0256762 A1 | 10/2012 | Greenberger |
| 2012/0257729 A1 | 10/2012 | Piett et al. |
| 2012/0271883 A1 | 10/2012 | Montoya et al. |
| 2012/0327837 A1 | 12/2012 | Harrington et al. |
| 2013/0060729 A1 | 3/2013 | Massey |
| 2013/0124525 A1 | 5/2013 | Anderson et al. |
| 2013/0130715 A1 | 5/2013 | Haney |
| 2013/0144523 A1 | 6/2013 | Haney |
| 2013/0144963 A1 | 6/2013 | Parker et al. |
| 2013/0157610 A1 | 6/2013 | Vainik et al. |
| 2013/0165068 A1 | 6/2013 | Keller et al. |
| 2013/0188783 A1 | 7/2013 | Boni et al. |
| 2013/0203039 A1 | 8/2013 | Piett et al. |
| 2013/0214939 A1 | 8/2013 | Washlow et al. |
| 2013/0218681 A1 | 8/2013 | Haney |
| 2013/0222133 A1 | 8/2013 | Schultz et al. |
| 2013/0241726 A1 | 9/2013 | Hunter et al. |
| 2013/0244576 A1 | 9/2013 | Morohoshi |
| 2013/0332861 A1 | 12/2013 | D'Agnese et al. |
| 2014/0024333 A1 | 1/2014 | Stadtlander |
| 2014/0026094 A1 | 1/2014 | Zimmerman et al. |
| 2014/0089243 A1 | 3/2014 | Oppenheimer |
| 2014/0118140 A1 | 5/2014 | Amis |
| 2014/0120977 A1 | 5/2014 | Amis |
| 2014/0143729 A1 | 5/2014 | Myers et al. |
| 2014/0148135 A1 | 5/2014 | Haney |
| 2014/0155018 A1 | 6/2014 | Fan et al. |
| 2014/0189887 A1 | 7/2014 | Raju |
| 2014/0195626 A1 | 7/2014 | Ruff et al. |
| 2014/0200903 A1 | 7/2014 | Hancock et al. |
| 2014/0214979 A1 | 7/2014 | Turakhia |
| 2014/0245158 A1 | 8/2014 | Greenberg et al. |
| 2014/0253326 A1 | 9/2014 | Cho et al. |
| 2014/0257889 A1 | 9/2014 | Ashley et al. |
| 2014/0282703 A1 | 9/2014 | Garg |

(56) References Cited

U.S. PATENT DOCUMENTS

2014/0302841 A1    10/2014  Krco et al.
2014/0316687 A1    10/2014  Nortrup

OTHER PUBLICATIONS

Nena, Detailed Functional and Interface Specification for the NENA i3 Solution—Stage 3, NENA, Jun. 2011, 282 pages.
Nice, Nice's NG9-1-1 Solution Overview, Nice, Apr. 2012, 11 pages.
PCT International Search Report and Written Opinion for PCT/US2014/021556, Jun. 27, 2014, 21 Pages.
TECB NG9-1-1 over NetTN Program Vendor Controller Interface Recommendations, TECB, May 26, 2011, 28 pages.
PCT International Search Report and Written Opinion for PCT/US15/22026, Jul. 2, 2015, 15 pages.

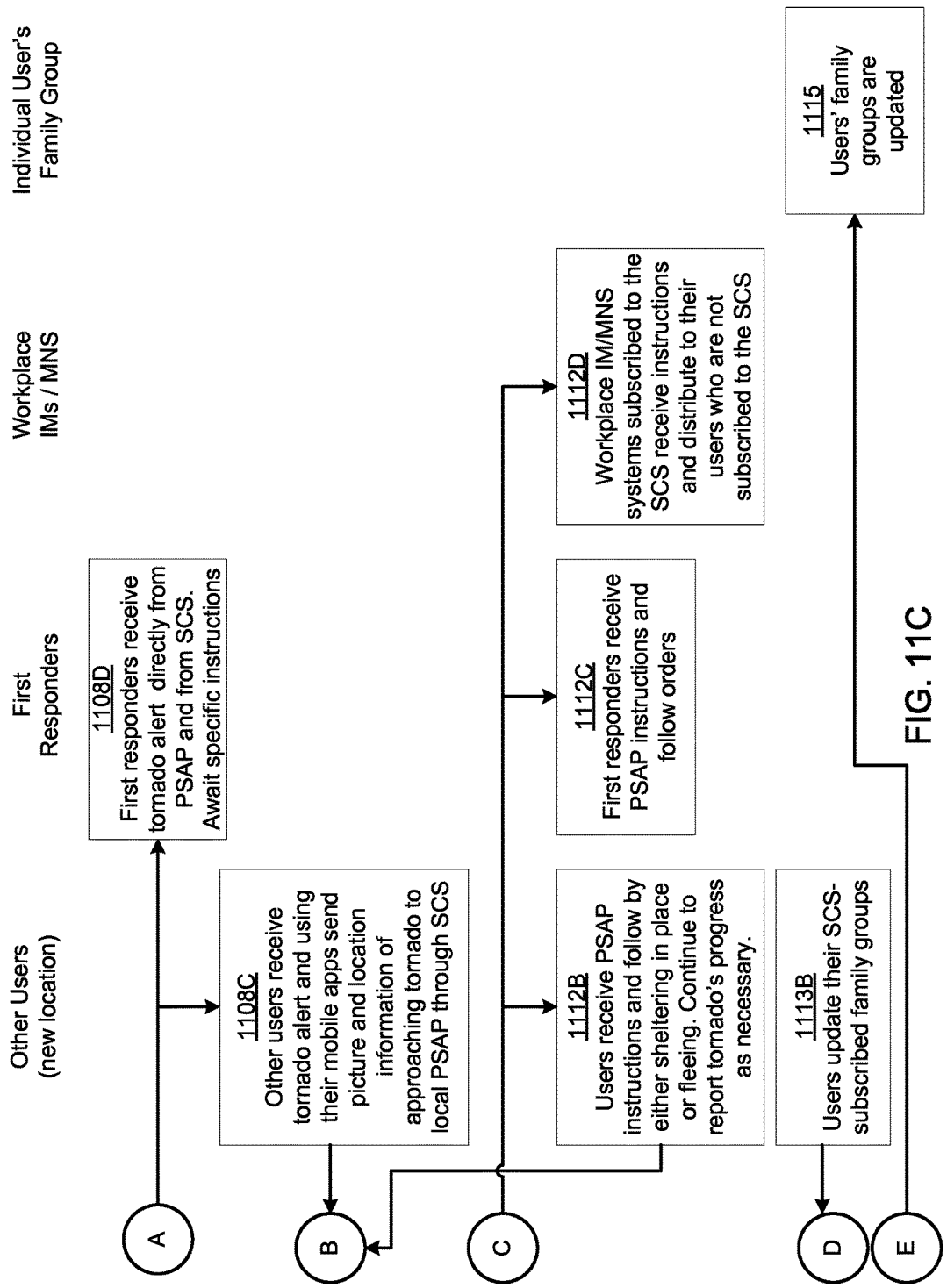

CRISIS-RELATED INFORMATION EXCHANGE HUB

CROSS REFERENCE TO RELATED APPLICATIONS

This application is a continuation of co-pending U.S. application Ser. No. 14/223,054, filed Mar. 24, 2014, which is incorporated by reference in its entirety.

BACKGROUND

The subject matter described herein relates to managing the exchange of crisis-related information, and in particular, information proliferation to and from individuals associated with multiple formal and informal organizations.

The commonly used means available today for an individual to report an emergency is to call 911 and be directed to the local police, fire, or emergency medical services. Separately, individuals will typically communicate with related groups of people, such as their families, work colleagues, team mates, classmates, and the like. Such communication is sequential, unstructured and is often prioritized based on factors that are not optimized to a speedy resolution of the crisis, potentially increasing risk to the person or others.

Existing standards and systems do not enable individuals to communicate structured crisis-related information amongst multiple organizations and/or groups of individuals. Consequently, during a crisis, individuals typically use multiple means of unstructured communications, such as phone calls, social media, and text messaging to reach all their intended audiences. This results in inefficient crisis management, risking both life and property.

Existing standards and systems do not enable organizations to engage in bi-directional communication of crisis-related information with multiple individuals or groups of individuals without previously arranging for proprietary access to the computing devices and/or networks corresponding to those individuals and groups. Consequently, organizations must use multiple means of communications to reach their intended audiences such as the Emergency Alerting System, media outlets, and one-way mass notification systems.

Typically, organizations communicate crisis-related information only with their own personnel, if at all, using one-way mass notification systems. Other organizations supply their intended audiences with proprietary means of bi-directional communications such as a dedicated application running on a smart-phone or tablet computer, or provide a call center access for individuals to report emergencies. Other organizations may use one-way public safety broadcast channels such as the Emergency Alerting System (EAS) and the Wireless Emergency Alert (WEA) to announce crisis situations.

One challenge for crisis communications management is providing the ability to precisely target audiences associated with the crisis for emergency communications. A scenario illustrating this challenge is provided by the following example.

An accident occurs affecting multiple individuals, including casualties, observers, first responders, and emergency management personnel. Those individuals are typically unrelated to each other and each individual is related to multiple groups which may include, but are not limited to, their families, communities, workplaces, enterprises, and educational institutions. The individuals affected are those who happen to be in the vicinity of the accident, people who work nearby, members of various law enforcement organizations, emergency medical personnel, and the like.

Throughout the evolution of the accident event, individuals need to communicate with multiple groups and organizations to which they are related. For example, accident casualties need to report, if they are able to, their location and state of injuries to both their families and first responders. Observers of the event can contribute to the situational awareness of the emergency services by sending text, images, or video reports to the relevant Public Safety Access Point (PSAP) while informing their families and workplaces that they are safe. Depending on the accident circumstances, first responders and command authorities may need to instruct the public to either stay sheltered or avoid certain areas. PSAP and command authorities may need to enlist help of various first responder and emergency medical resources which may or may not be under their direct control.

Using today's technologies, each of the constituents described in this example will use multiple communication mechanisms and channels to attempt to reach their intended audiences. Accident casualties may call 911 to report their location and state. Separately, they will call members of their families to inform them of their location and state. Observers will also attempt to call 911 to verbally report their observations. Individuals who happen to be near the accident location may call their workplaces to inform them of their own location, state, and/or details of the accident. Command authorities may use mass notification systems to inform their subscribers of the accident and required actions. The PSAP will use their proprietary communication systems to reach first responders that are under their direct control and use other communication mechanisms such as telephone calls to reach out for assistance from resources that are not under their direct control. Members of the public may tune to news media or use social networks to receive details of the event, potentially receiving information which is not authoritative, not accurate, incomplete, and/or misleading, which may result in mass confusion. Such confusion may even result in risk of physical harm to individuals who would otherwise be safe.

These various communication mechanisms and channels are unrelated to each other and must therefore be used separately and sequentially by each sender and receiver of the communication. Inevitably, these circumstances lead to delays and potentially to errors in communications, risking lives and property.

Existing organizational and community notification systems are not capable of targeting individuals who are not related to the organization or community. Availability of such individuals may be crucial to the resolution of a crisis, by virtue of their skills, physical availability, and location. As such individuals are associated with other organizations, they are not directly accessible or targetable to the manager of a crisis situation when using existing notification systems.

Yet another challenge for crisis communications management is that effective crisis management requires the participation of multiple organizations and individuals who do not have access to each of the systems participating in managing the crisis event. Such systems typically operate behind firewalls and on private networks to which only authorized individuals who are members of or related to the organization have access. No system or exchange mechanism exists today that can securely facilitate the exchange of information amongst multiple crisis management systems and individuals who participate in the crisis event who are not authorized to access all such systems.

BRIEF DESCRIPTION OF THE DRAWINGS

The figures depict various embodiments for purposes of illustration only. One skilled in the art will readily recognize from the following discussion that alternative embodiments of the illustrated systems and methods may be employed without departing from the principles described herein.

FIGS. 11A-11C illustrate a comprehensive exemplary scenario in which a mobile user travels to a location different from his or her home location and experiences a crisis situation, according to one embodiment.

DETAILED DESCRIPTION

Figure 1:
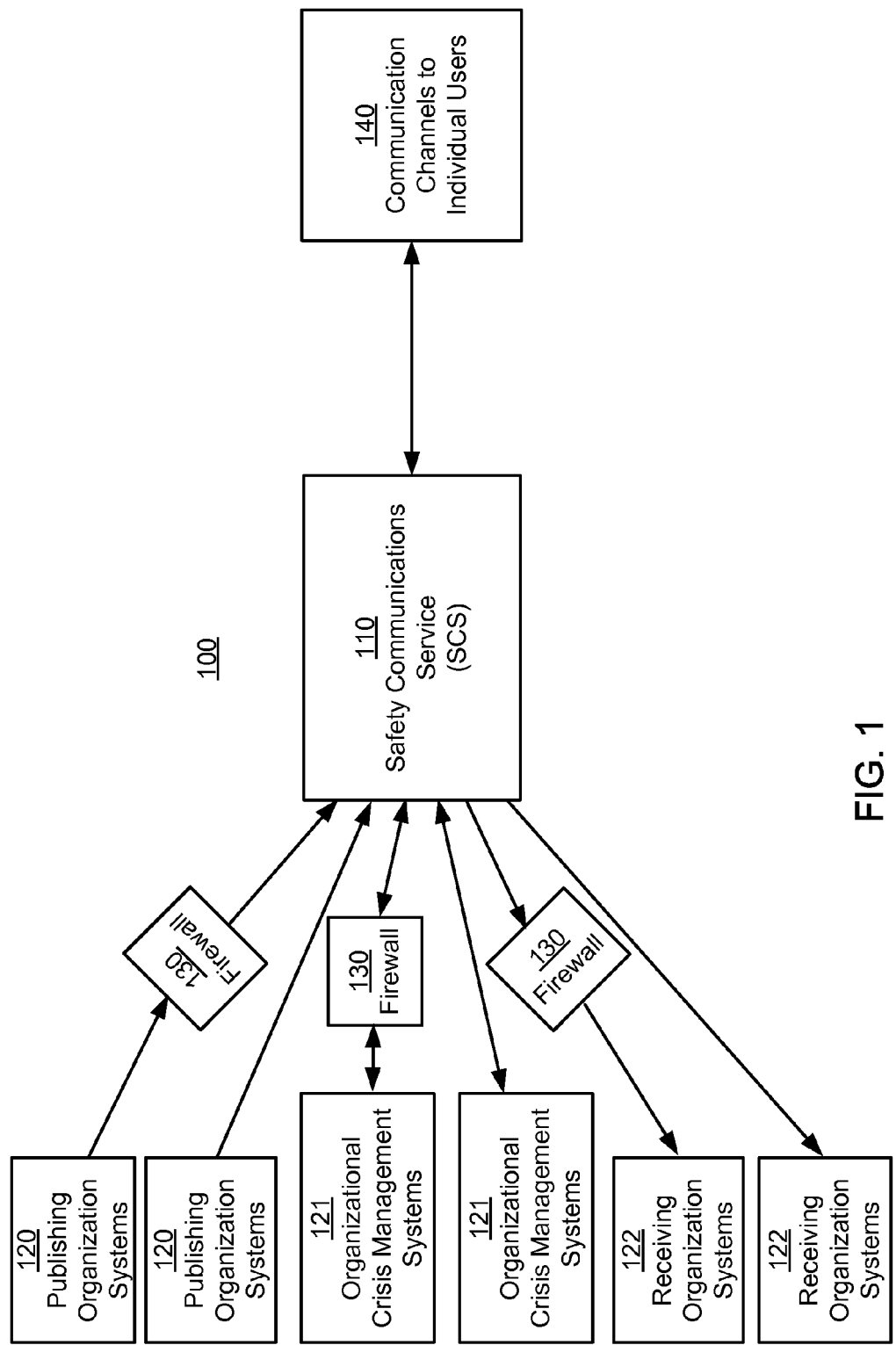
FIG. 1 is a high-level diagram conceptually illustrating the exchange of crisis-related information between different entities, according to one embodiment.

People's lives involve multiple groups of entities that are based on various relationships, and people communicate with other members of those groups in different ways, dependent in part of the nature of the corresponding relationship. These groups include, but are not limited to: family, community, town, state, country of residence, workplace, and educational institution. Individuals may also be a part of ad-hoc groups that are the result of being present at certain locations at certain times, such as concerts, sporting events, or vacation destinations.

When a crisis occurs, an individual may have the need to communicate with some or all other members of these groups. For example, when a particular individual observes a crime being committed, she (or he) may want to initiate a report to the local police department. She may also want to report her current whereabouts to her family and let them know that she is safe as well as inform her employer that she is being delayed and will not arrive at her workplace on time.

While dealing with the crime scene the local police department may need to establish a security perimeter and initiate communications to individuals present within the perimeter. The police department may instruct such individuals to stay in place while individuals outside of the security perimeter may be instructed to stay clear of the crime scene.

Upon receipt of communications from the police, other individuals in the vicinity of the crime scene may want to report their observations to the emergency personnel in order to add to their situational awareness as well as inform their families and workplace colleagues of their whereabouts and status.

The police dispatcher may also need to dispatch to the scene additional first responders from the local police department and/or emergency medical services.

This simplified example illustrates how effective crisis communications requires that multiple individuals communicate bi-directionally with multiple organizations and individuals. Depending on the individual's role within the various groups and organizations related to the crisis, this communication may take different forms.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Functional Overview

The system disclosed herein is directed generally to providing management of the exchange of crisis-related information amongst multiple individual users and multiple organizations. The system shall be referred herein as a Crisis Information Exchange (CIE). In at least one embodiment the system includes a Safety Communications Service (SCS), one or more end-user applications, one or more communication interfaces, and an Application Programming Interface (API).

Structured crisis-related information enables information to be communicated between entities using a consistent data framework, which improves the efficiency and accuracy of communication. This CIE-provided framework enables a consistent, rule- and form-based communication that supports predictable workflows, reducing the likelihood of incorrect information being dispersed, and making operation of the system faster, simpler and more intuitive for users, as compared to unstructured communications. Embodiments of structured crisis-related information include, but are not limited to, form-based multimedia messages from organizations, predefined notification to crisis-related information from individuals, predefined crisis-related reports from individuals in the field, and the like.

In one embodiment, the CIE provides services for the exchange of crisis information amongst multiple organizations and multiple individual users. These services enable the bi-directional communication of structured crisis-related information amongst multiple entities, including multiple individuals and multiple organizations and/or groups of individuals. Using the CIE, for example, multiple individuals are able to communicate structured crisis-related information with multiple organizations and associates of individuals, using multiple communication devices available to them, thereby increasing the speed, accuracy, and efficiency of their crisis-related communications.

In another embodiment, the CIE provides services for the exchange of crisis information amongst multiple organizations. These services enable the communication of structured crisis-related information from information publishers such as the National Weather Service (NWS) or the Integrated Public Alert and Warning System (IPAWS) to organizational crisis-management systems and public safety access points (PSAPs). These services also include the exchange of structured crisis-related information amongst different crisis-management systems and the communications of structured crisis-related information from crisis-management systems to Public Service Access Points (PSAPs) and alerting systems such as the Emergency Alerting System (EAS).

In a further embodiment, the CIE additionally provides services for the exchange of crisis information amongst multiple individuals. These services enable the bi-directional communication of structured crisis-related information amongst multiple individuals that have established associations amongst them, such as families, members of a community, a religious organization, a sports team, and the like.

In various embodiments, the services provided by the CIE enable organizations to target individuals that are most relevant to the resolution of a crisis and to inform individuals that may be impacted by the crisis directly or indirectly, regardless of their organizational affiliation. The system is capable of determining the relevance of individuals to the resolution of a crisis based on multiple parameters including, but not limited to, the individual's information preferences, location, role, skills, and schedule.

In various embodiments, the services provided by the CIE also enable organizations to target individuals and organizations that may or may not be associated with the originating organization, based on multiple parameters including, but not limited to, the individual's information preferences, location, role, skills, and schedule. For example, an emergency operations center may target all individuals and organizations located within a certain area within a certain time frame, regardless of their organizational affiliations.

In various embodiments, the CIE facilitates the reliable and secure exchange of information amongst multiple crisis management systems that participate in the management of a crisis event, enabling each of these systems to securely operate behind their respective firewalls and on their private networks within which only their own authorized individual users may operate. The CIE does not manage the crisis itself, but rather enables each of the crisis management systems to operate by reliably, securely, and bi-directionally exchanging crisis information with relevant individuals and organizations.

In one embodiment, the SCS is a scalable, geographically-distributed information system serving a plurality of individual users' devices and a plurality of organizations' systems. The SCS manages the flow of information amongst user devices and organizational systems to ensure reliability of communications and protect organizational network security while implementing business rules for the routing of messages between multiple individuals, organizations, and groups.

End-user devices enable end users to communicate bi-directionally with multiple organizations and groups of other individuals, through the SCS. Means for such communications include, but are not limited to: a Personnel Safety Mobile Applications for multiple mobile devices and mobile operating system platforms, a Web user interface application for multiple types of Web browser clients, a FACEBOOK™ application, and a PC-based application, as well as communications via voice calls, text messages, emails, etc. Generally, the end-user applications offer similar functionality and user experience, subject to their respective platform limitations. However, in some embodiments, certain end-user applications may be customized to meet specialized requirements of individual users and/or organizations.

In various embodiments, the communication interfaces comprise hardware and software components that interface between the SCS and various communications systems including, but not limited to: text messaging systems, telephony systems, indoor and outdoor mass-notification systems, and the Emergency Alerting System (EAS), and Wireless Emergency Alerts (WEA).

Embodiments of the disclosed system provide organizational systems and informal groups subscribing to the CIE (referred to herein as "subscribed systems") with different types of subscriptions to the CIE's services. Associations manifest real-world relationships amongst entities (e.g., a family group, an organization and its employees, people present in a given area, etc.) and subscriptions define a set of rules that are used by the CIE to determine which individuals and/or organizations receive a given message based on the real-world relationships.

Subscription types can include, but are not limited to: a) Publish Only—systems such as the National Weather Service that are capable only of providing information and do not receive information from users; b) Receive Only—systems such as a 911 Public Safety Access Point (PSAP) that only accept messages initiated by users or the Emergency Alerting System (EAS), and/or c) Bidirectional—systems such as organizational or regional crisis management systems that publish as well as receive information as well as informal associations, such as members of a family or friends and individuals currently in a particular geographic area.

In one embodiment, the CIE provides the capability to manage composite profiles of each user. These composite profiles comprise attributes common to all of the associations of the user, such as the user's identity, as well as attributes that are specific to each association, such as the role of the individual within a given organization or the particular communication device(s) that the individual typically uses to communicate with the recipients identified by a given association. For example, an individual may be a member of the faculty of his university and also a volunteer fire fighter of his community. These two roles are specific to the two associations but the individual's name, home address, and vehicle information are common to both associations. As another example, an individual may use a company cell phone to communicate with colleagues and clients, but a personal cell phone to communicate with family and friends. Composite profiles enable the CIE to create subscriptions such that each individual can send and receive messages that are directed at groups that conform to various rules.

In some embodiments, the CIE provides capabilities for managing repositories that store data about users and their devices. These repositories include user records comprising subscription and association data indicating relevant organizational systems with which the user can communicate, and which devices should be used for such communication. The capabilities of the CIE include, but are not limited to, registering one or more users with subscribed systems and associating the one or more users with other users of the subscribed systems. In one such embodiment, each user record includes the user's details including the user's names, organizational and group associations, roles within each organization or group, devices through which the user may be contacted, the ordinal priority by which message delivery to the devices should be attempted, and the user's current and default locations. In other such embodiments user records may contain different fields. In some embodiments, some of the information is shared with multiple organizations (e.g., user name), while other data is organization-specific (e.g., role within that organization).

In some embodiments, the CIE enables organization systems and individual subscribers to set up rules governing which individual users and other organization's systems may subscribe to their services. Such rules may include, but are not limited to, opt-in subscription, opt-out subscription, mandatory subscription by the subscriber, subscription by-reference of other subscribers, or ad-hoc subscription based on location or message context.

In some embodiments the CIE enables subscribed organization systems and individual users to set up rules by which messages from individual users are accepted, processed and routed. The CIE provides individual users with ad-hoc subscription and association services, based on configurable rules. Those rules determine the individual user's eligibility to receive a given communication. Ad-hoc subscriptions are created based on a user's current situation (e.g., based on the user's location and/or the current time). For example, if a user is observed to be located within a new city or neighborhood, an ad-hoc subscription may be created subscribing the user to notifications from the local emergency services. This ad-hoc subscription may last indefinitely or expire at a certain time, such as when the user leaves the location, after a set amount of time (e.g., one month), or a set amount of times after the user leaves the location (e.g., one week). In one embodiment, potential ad-hoc subscriptions are presented to the user for approval before being finalized.

The CIE routes crisis-related information amongst multiple individual users and multiple organizations based on the corresponding subscriptions. The CIE routes individual user-initiated communications to any number of subscribed systems based on configurable business rules. Those rules determine which organizations shall receive the individual user's communication. For example, which organizations shall receive a particular communication can be based on a type of the information submitted, a role of user, a location of user, and/or a time of the particular communication. The CIE routes subscribed system-initiated communications to multiple individual users based on configurable business rules. Those rules determine which individual users shall receive the user's communication.

The various client applications used by the individual users connect each user with the CIE and through the CIE to the various subscribed systems and groups with which they are associated. The client applications also provide the user with the interface with the system's functionality including, but not limited to, registration, submitting personal information, contact details, subscription preferences, sending and receiving messages, viewing disseminated information, and reporting functionality, as well as providing visual and tonal alerts to the user.

Embodiments of the disclosed system provide numerous advantages over existing crisis management and notifications systems. Four such advantages are described below. One of skill in the art will recognize additional advantages and features based on the disclosure herein.

Firstly, embodiments of the disclosed system provide organizations subscribed to the CIE with the ability to communicate with multiple relevant individual users in crisis situations regardless of whether or not these users are members of the organization. It also provides an individual user with the ability to communicate with multiple organizations and groups. Further, an individual user can communicate with multiple organizations and groups wherever that user is located using a single application on a mobile device, rather than multiple proprietary applications that are each capable of only communicating with a single system. Thus, the user can quickly and efficiently respond to multiple organizations in cases of emergency.

Secondly, embodiments of the disclosed system provide structured communications exchanges that can be used during emergencies. These structured communications prevent inaccurate communications and enables information to be quickly processed during a crisis situation by all of the relevant parties. For example, an application running on a mobile device may provide a plurality of reports that the user may submit. On selection of a particular report, the user is presented with a simple form to complete that prompts the user to provide the required data.

Thirdly, embodiments of the disclosed system provide mechanisms for organizations and user groups to establish flexible subscription policies. Organizations may use an opt-in policy where individuals associated with the organization are sent invitations to subscribe to the organization's crisis management system. Organizations may also use an opt-out policy where individuals associated with the organization are subscribers by default and must explicitly opt-out to stop receiving communications from the organization's crisis management system. Organizations may also mandate that certain users will be subscribers and/or that certain users will be blocked from being subscribers. Organizations may also automatically subscribe users, based on the users' location and preferences. Finally, organizations may also use a combination of these policies.

Fourthly, embodiments of the disclosed system provide subscribed systems with the ability to communicate with the CIE using a unique polling mechanism that enables secure low-latency bi-directional communications with users' devices while facilitating the exchange of information amongst multiple crisis management systems and individuals who participate in the crisis event and who are unauthorized to access all such systems.

System Architecture

FIG. 1 is a high-level diagram illustrating one embodiment of a CIE 100 that includes at least one SCS 110 coupled with a plurality of publishing organization systems 120 (e.g., servers) operated by information publishers such as the National Weather Service. At least one of the publishing organization systems 120 is coupled to the SCS 110 via a firewall 130, which protects the data security of the publishing organization. The SCS 110 is also coupled with a plurality of organizational crisis management systems 121 operated by subscribing organizations such as corporations, universities, industrial facilities, or military bases. At least one of the organizational crisis management systems 121 is coupled to the SCS 110 via a firewall 130, which protects the data security of the subscribing organization. The SCS 110 is further coupled with a plurality of receiving organization systems 122 operated by organizations that have subscribed to receive communications from the SCS such as corporations, universities, industrial facilities, or military bases. At least one of the receiving organization systems 121 is coupled to the SCS 110 via a firewall 130, which protects the data security of the receiving organization. In addition, the SCS 110 is configured to manage communication between the various organizations and individual users using one or more communication channels 140 (e.g., sending updates to a mobile application executing on users' mobile devices and prompting them to provide a reply, sending text messages to users' cell phones, sending automated messages to users' landline phones, broadcasting information using public announcement systems, and the like).

In one embodiment, the SCS 110 comprises one or more distributed computer systems running specialized software for providing the functionality described herein. The SCS 110 is also coupled with at least one communication channel 140 to communicate with individual users. In other embodiments, the SCS 110 comprises different and/or additional components. Further, the functionality attributed herein to the SCS 110 may be distributed between various elements of the CIE 100 in other manners. Distribution of CIE 100 elements may be between two or more computer systems that are located at separate geographic locations.

The CIE 100 provides services for the exchange of crisis information amongst multiple organizations and multiple individual users. These services enable the bi-directional communication of structured crisis-related information amongst individuals with multiple organizations and/or groups of individuals. Using the CIE 100, multiple individuals are able to communicate structured crisis-related information with multiple organizations and groups, using multiple communication devices available to them, thereby increasing the speed, accuracy, and efficiency of their crisis-related communications.

In various embodiments, the services provided by the CIE 100 enable organizations to precisely target the individuals that are most relevant to the resolution of a crisis or could be impacted by the crisis either directly or indirectly, regardless of their organizational affiliation. The system is capable of determining the relevance of individuals to the resolution of a crisis based on multiple parameters including, but not limited to the individual's role, skills, location, and availability at the relevant time, as well as their association with one or more relevant groups. Additionally, the system can make relevant individuals aware of the situation or receive specific instructions (e.g., an evacuation or shelter in place order) via one or more communication channels 140. For example, if a fire or other emergency occurs on the premises of an organization, the organization's crisis management system 121 may send a request for help via the SCS 110 to all users within a defined radius of the emergency that are certified first responders, regardless of whether those first responders have previous ties with, or are even aware of, the organization. As another example, if an organization experiences a catastrophic equipment failure at one of its manufacturing facilities, the organization's crisis management system 121 may send a first message via the SCS 110 to all of the organization's engineers that are listed as "on-call" and a second message to the organization's clients informing them that delivery of product may be delayed due to the equipment failure.

Figure 2:
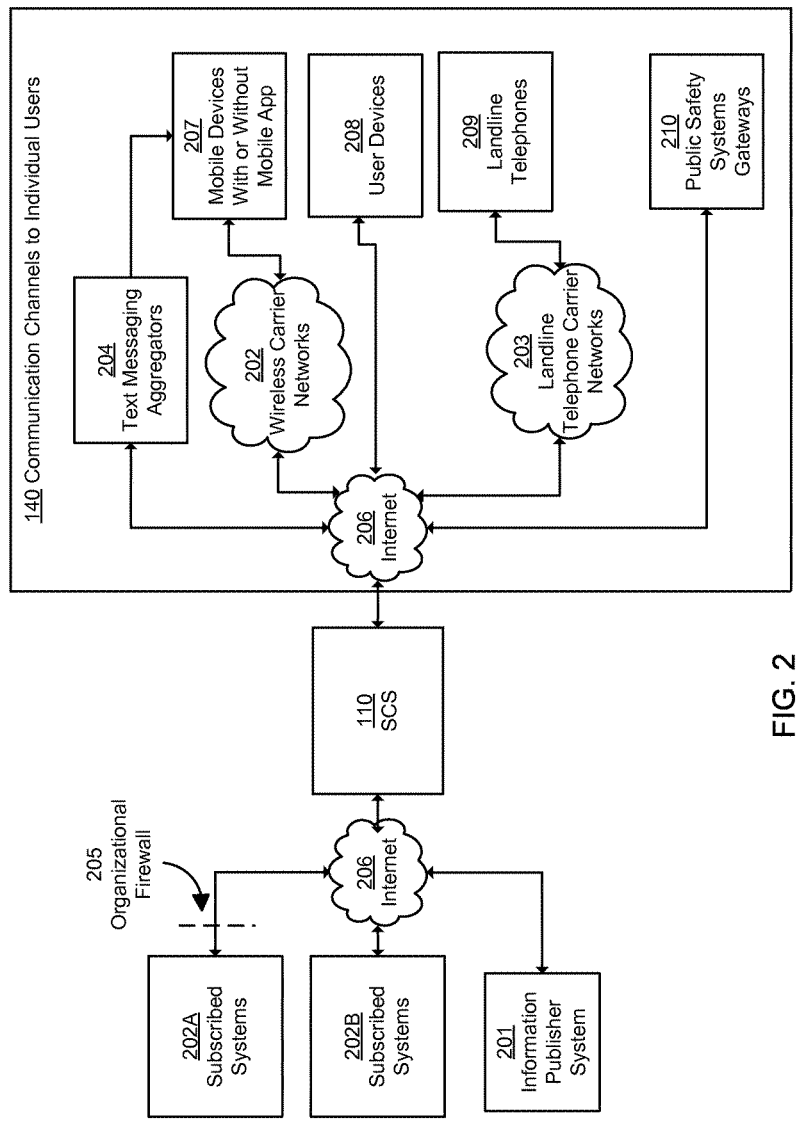
FIG. 2 is a block diagram illustrating an exemplary deployment of the disclosed system and the interconnections of a safety communications service (SCS) with subscribing organizations, information publishers, and individual users via various communication channels, according to one embodiment.

FIG. 2 illustrates an exemplary deployment of a CIE 100 and the interconnections of the SCS 110 with subscribing organization systems 202, information publisher systems 201, and various communication channels to individual users 140, according to one embodiment. In the embodiment shown, the CIE system 100 operates using the Internet 206 as its network backbone, but in other embodiments, other types of network such as private Internet Protocol-based (IP-based) networks are used.

In the illustrated embodiment, the SCS 110 receives feeds from various information publisher systems 201 and communicates the information in the feeds to subscribing organization and individual users via various communication channels 140, as per their subscription rules. Examples of information publishers are weather forecasters and the US Geological Survey (USGS). For example, if the National Weather Service issues a hurricane warning for a given county, all users and organizations that subscribe to weather warnings and are determined to be in (or, in some embodiments, near) the county are provided with the warning. Alternatively, all registered users in the area may be provided with the warning, regardless of subscriptions, as the consequences of being unprepared for the hurricane are particularly catastrophic. In another embodiment, associates of affected individuals such as family members are also be informed of the situation and/or given specific instructions.

The illustrated embodiment of the SCS 110 facilitates the reliable and secure exchange of information amongst one or more subscribed systems 202A operated by organizations that participate in the management of a crisis event, enabling each of these systems to securely operate behind their respective organizational firewalls 205 and on corresponding private networks within which only the corresponding organization's own authorized individual users may operate. The SCS 110 also supports one or more subscribed systems 202B—organizational or otherwise—that operate openly on the Internet 206. Connecting with subscribed systems 202A behind organizational firewalls 205 without opening such systems to the Public Internet 206 and introducing additional security threats introduces technical challenges that are resolved using the mechanisms elaborated by the detailed description associated with FIG. 5 below.

In some embodiments, the SCS 110 bi-directionally exchanges messages with users' mobile devices 207 via the Internet 206 and a secondary delivery service, such as a text message aggregator 204 and/or a wireless carrier's data network 202. In one such embodiment, the mobile devices 207 run one or more dedicated end-user applications, such as a Personal Safety Mobile Application provided by the operator of the SCS 110, which receives, sends, and displays messages that are exchanged with the SCS. In other embodiments, no specialized software is required by the mobile devices 207, with messages being delivered via conventional mechanisms, such as SMS text message.

In some embodiments, the SCS 110 bi-directionally exchanges messages directly over the Internet 206 with user devices 208 such as desktop, laptop, and tablet computers, as well as other IP-based communication devices such as IP-telephony systems 208. In one such embodiment, such devices and systems 208 run one or more dedicated end-user applications, such as a Web user interface application for multiple types of Web browser clients, a FACEBOOK™ application, and/or a PC-based application. Such end-user applications offer similar functionality and user experience, subject to their respective platform limitations. In other embodiments, no specialized software is required by such mobile devices 207, with messages being delivered via conventional mechanisms, such as email or instant messenger (IM) services.

In some embodiments, the SCS 110 exchanges messages bi-directionally with landline telephone systems 209 and/or services that provide bi-directional exchanges of messages to landline and cellular phones.

In some embodiments, the SCS 110 exchanges messages bi-directionally with Public Safety System gateways 210. Typically, the SCS 110 sends alert messages to the Public Safety System gateways 210 to be disseminated to the public by each of those systems. In one such embodiment, the SCS 110 also receives operational reports, such as results of public alert activations or health status reports of the Public Safety Systems. These gateways 210 include, but are not limited to the Emergency Alerting System (EAS), WEA, gateways to community and campus alerting systems (e.g., Giant Voice and/or siren), IPAWS, in-building mass notification systems, and public address systems.

Figure 3:
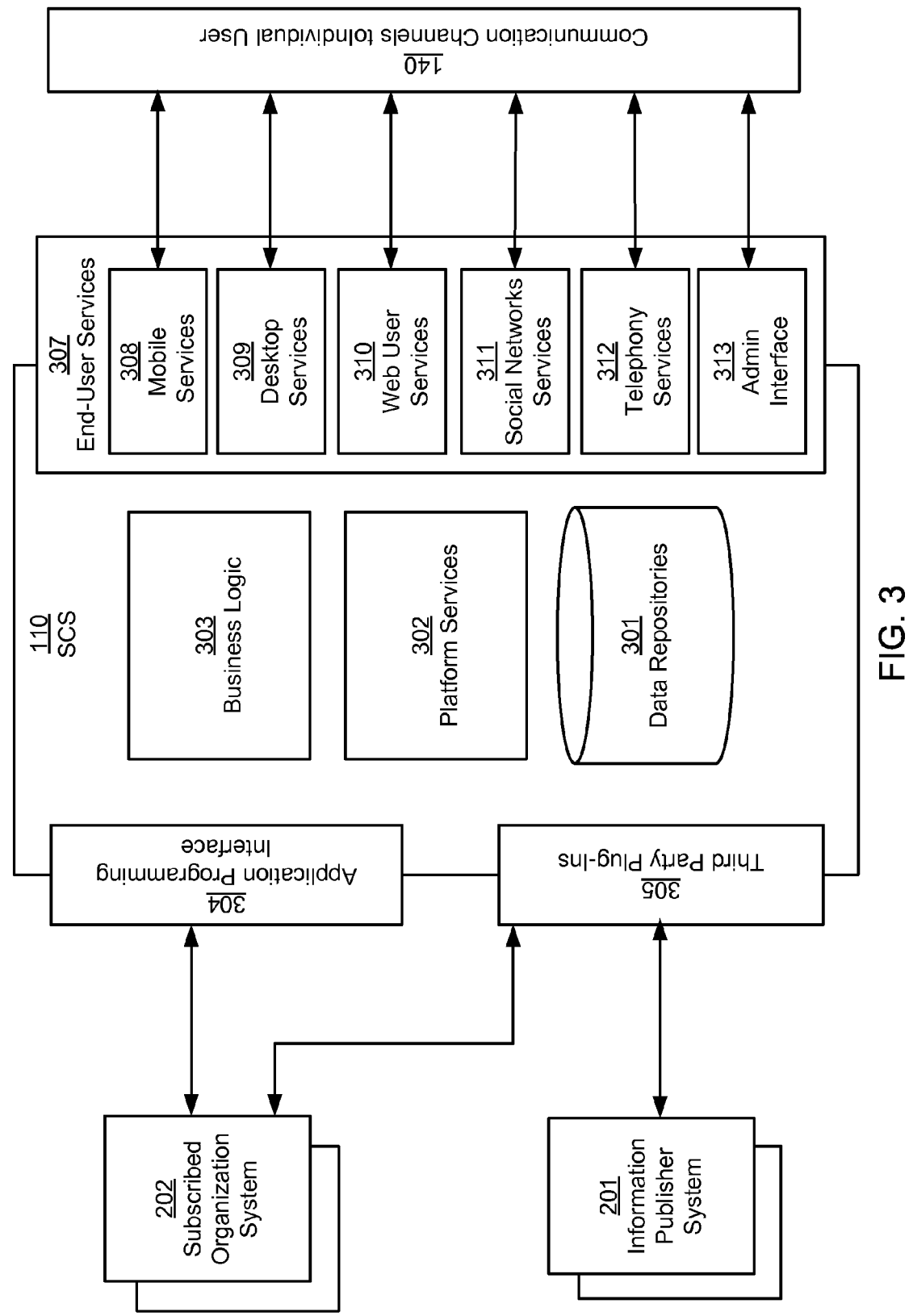
FIG. 3 is a block diagram of illustrating one embodiment of the SCS shown in FIG. 2.

FIG. 3 illustrates the main building blocks of the SCS 110 and its interfaces with subscribed organization systems 202 and individual users via one or more communication channels 140, according to one embodiment. In the illustrated embodiment, the SCS 110 includes three main building blocks: Data Repositories 301, Platform Services 302, and Business Logic 303. The SCS 110 also includes interfaces for interacting with other components in the CIE 100, such as an API 304, one or more third party plug-ins 305, and interfaces for end-user services 307.

Figure 4:
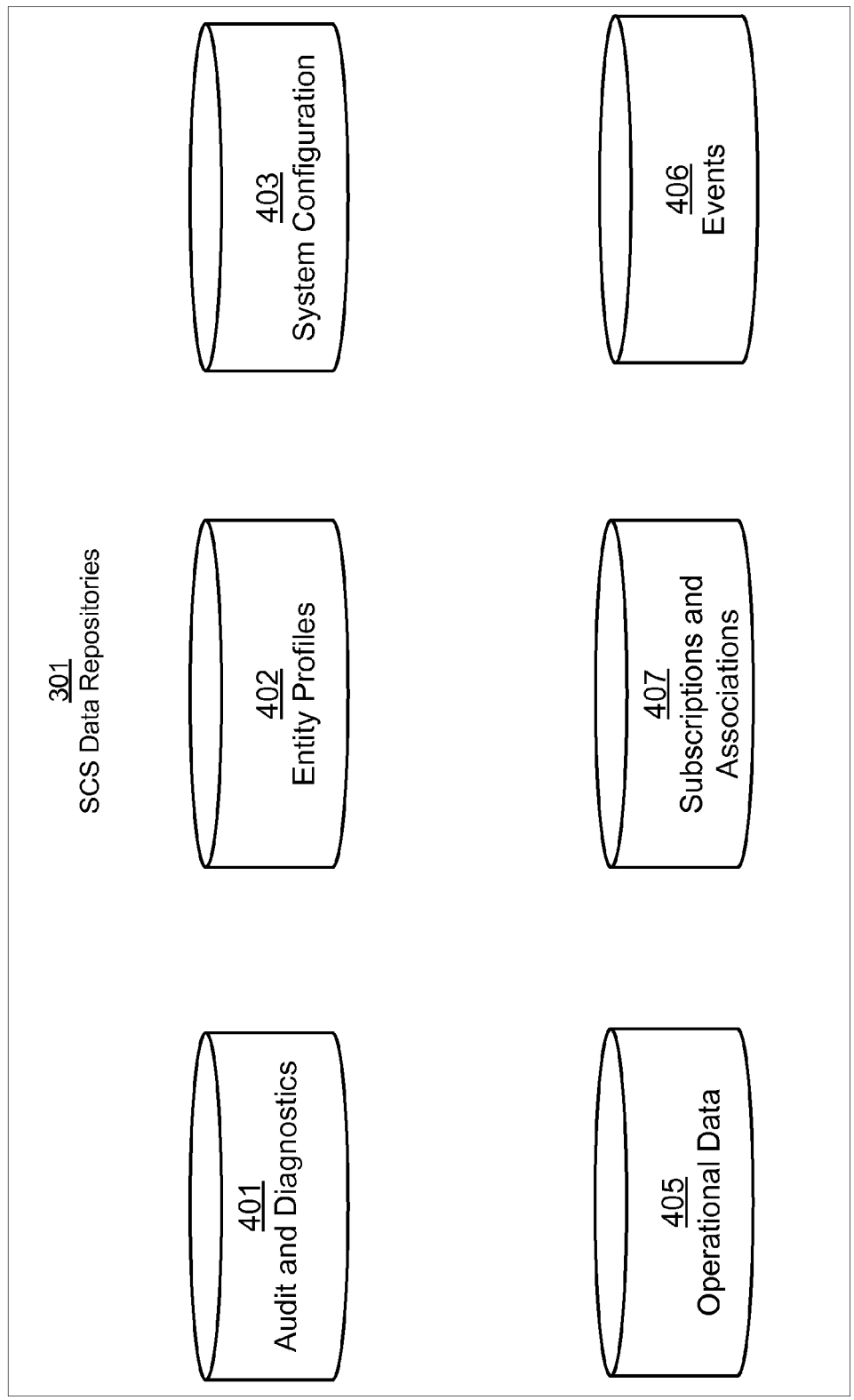
FIG. 4 is a diagram illustrating the various data repositories included in the SCS, according to one embodiment.

The SCS data repositories 301, which are described in further detail below, with reference to FIG. 4, provide persistent storage and retrieval capabilities for all relevant entities. In one embodiment, the data repositories 301 comprise at least one non-transitory computer readable storage medium configured to store data to facilitate effective operation of the SCS 110, such as messages for delivery, system settings, applications for data processing and security, system logs, subscription information, and the like.

Generally, the SCS Platform Services 302 are sub-divided into multiple categories of service, including: (a) security services, (b) communications services, and (c) foundation services. In some embodiments, additional services that do not neatly fit into one of these categories may be provided. The SCS Platform Security Services protect the data security of the other entities in the CIE 100. In one embodiment, the SCS Platform Security Services comprise of: (a) authentication, authorization, and accounting services; (b) single sign-on (SSO) services to the various systems the comprise the CIE 100; (c) protection services against malicious attempts to make the CIE resources unavailable to its intended users, such as denial-of-service (DoS) attacks; and (d) content security assessments.

The SCS Platform Communications Services facilitate communication between the SCS 110 and the various other entities in the CIE 100. In one embodiment, the SCS Platform Communication Services comprise of: (a) connections services which maintain persistent or long-lasting connections between the SCS 110 and the various subscribed organizational systems 120; (b) web services where the SCS receives, processes, and responds to organizational and user clients' requests for resources; and (c) web services which provide a messaging framework for the exchange of structured crisis-related information between the SCS and its clients.

The SCS Platform Foundation Services provide administrative services to the various other subsystems within the SCS 110. In one embodiment, these services comprise of: (a) audit and logging services, which record and provide documentary evidence of the sequence of activities that have affected a specific operation, procedure, or event; (b) task scheduling services which enable unattended scheduled execution of applications, scripts, and services; (c) diagnostic services which provide tools for technical and status analysis when exceptions are trapped; (d) workflow management services which provide orchestration of operational and technical task sequences; (e) health monitoring services which provide ongoing monitoring of operational and technical measures and take preventive and corrective proactive actions in case of deviations; (f) high-availability services and disaster recovery software services that support computer clusters which can be reliably utilized with minimum down-time; and (g) ongoing system maintenance services, including services such as backup, restore, purging, and clean-ups.

The SCS Business Logic services 303 provide functionality to control and/or determine which users and organizations receive any given message. In one embodiment, the SCS Business Logic services 303 comprise of: (a) user subscription services; (b) organizational subscription services; (c) message routing and tracking services; and (d) location-based logic.

The SCS Business Logic User Subscription Services enable users and organizations to register and subscribe users to the services provided by the CIE. In one embodiment, these services comprise of services that: (a) enable the registration of user devices and gateways to those devices (e.g. wireless carriers); (b) enable a user to update the user's organizational affiliation(s), including updates to the user's role(s) and the group(s) the user belong to within organizations; such updates can be user initiated or follow a context-based business logic, including system recommendation to the user for additional subscriptions based on user preferences; (c) enable a user to configure the user's communication and permission preferences, including, but not limited to the user's permissions to receive and/or send information to/from affiliated organizations and the SCS's permission to track the user's location; and (d) enable a user to update other user profile information including, but not limited to the user's home location and a list of affiliated individuals (e.g., colleagues, family members, neighbors, and the like).

In various embodiments, a user's subscription profile can be initiated or modified by one or more of: (a) the user, depending on his or her privileges; (b) an organization, depending on the organization's privileges; and (c) a recommendation to the user by the SCS 110, based on the user communication preferences and permissions. For example, the SCS 110 might recognize that a subscribed user is located away from his or her home location and recommend, based on the user communication preferences, that the subscribed user subscribe to various information publishers, such as the local emergency management system, a localized weather alert service, and the like.

The SCS Business Logic Organizational Subscription Services enable organizations 120 to register and subscribe to the services provided by the CIE. In one embodiment, the organizational subscription services comprise of services that: (a) provide authentication, authorization, and account handling for subscribed organizations 120; (b) enable a subscribing organization to create and modify roles and groups of users; (c) enable a subscribing organization to register and subscribe users that are affiliated with the organization; (d) enable the organization to manage its communication and permission preferences, including, but not limited to the organization's permissions to send/or receive information to users and other subscribed organizations, the organization's communication policies, and the types of messages is the organization is authorized to receive and process from users; and (e) enable a subscribing organization to provide and update other organizational profile information.

The SCS's 110 message routing and tracking services are responsible for routing messages initiated by organizations' and users' to their intended audiences based on the specific targeting information contained within each message and/or the subscription profile of the individual recipient or organization. For example, if a specific audience is specified by the sender, than the message may be routed to that audience, whereas if the sender does not provide information regarding the target audience, the subscription profiles of potential recipients may be used to determine which individual users and organizations shall receive the message. In one embodiment, these services also track receipt of the messages by their intended recipients, resend messages based on built-in business rules, and report on the success or failure of the communication (e.g., to the audit and logging services).

For example, in response to a pipe bursting near one of an organization's offices, the organization may send a first message indicating that the office will be closed for the day to a group containing all employees that work at the affected office and a second message to subscribing organizations informing them that expected work product may be delayed due to the office closure. The SCS 110, attempts to deliver the first message to each employee and the second message to each subscribing organization. The SCS 110 tracks which employees and organizations confirm receipt (either manually or automatically). After a given time period (e.g., ten minutes) the SCS 110 resends the first message to any employees in the group that have not yet confirmed receipt.

The SCS 110 iterates through this process, continuing to resend the first message to employees that have not confirmed retreat until a preset number of attempts (e.g., five) have been made. After the preset number of attempts has been made, the SCS 110 reports back to the organization, indicating which employees confirmed receipt of the first message and which did not. Thus, the organization is made aware of which employees may not be aware of the closure. In another embodiment, a user who does not respond within given time may indicate the user is at risk, and thus a message will be dispatched to other designated users for resolution and follow up.

In contrast, the second message may only be re-sent if a delivery failure is reported, as repeatedly sending the same message to a client is likely to be viewed as an annoyance. Instead, the SCS 110 may report to an office manager of the originating organization which clients have failed to acknowledge receipt of the second message to assist the office manager in managing client relations with regards to the delay.

The SCS's 110 location-based logic is responsible for geo-spatial functionality within the SCS. In one embodiment, the services this logic provides include: (a) location-based automated subscriptions; (b) recommended subscriptions based on the user's device location; (c) outbound message distribution based on the user device's location and (d) applying location-based rules to inbound message processing.

The SCS 110 also provides one or more interfaces to subscribed organization systems 202. In the embodiment illustrated in FIG. 3, two types of interface are provided, an API 304 and Third-Party Plug-in interfaces 305. The API 304 provides a well-defined specification describing how subscribing organizations 120 must interact with the SCS 110. The API 304 is implemented as a SCS software subsystem that provides the software operations, data structures, object classes, and variables in conformance with the API's specification.

The Third Party Plug-ins 305 are implementations of various APIs of other systems that enable the SCS 110 to interact with these systems. Such systems for which plug-ins 305 may be provided include, but are not limited to, Information Publisher systems 201, such as the National Weather Service and organizational crisis management systems that do not themselves implement the SCS's API 304.

The SCS 110 interfaces with various end user devices and systems using a variety of end-user services 307 to communicate with end users via a corresponding communication channel 140. Each end-user service implements the appropriate protocol or API of the particular end-user device or system with software operations, data structures, object classes, and variables. In one embodiment, a SCS API for end-user devices and services is also provided. In the embodiment shown, the end user services 307 include mobile services 308, desktop services 309, web user services 310, Social Network Services 311, telephony services 312, and SCS administrator services 313. In other embodiments, additional and/or different interface are provided, such as services to public-safety gateways.

FIG. 4 illustrates the various SCS data repositories 301, according to one embodiment. In the illustrated embodiment, the repositories 301 include: (a) an audit and diagnostics repository 401, (b) a system configuration repository 403, (c) an entity profile repository 402, (d) an operational data repository 405, (e) an events repository, and (f) a subscription and association repository 407. In other embodiments, additional and/or different repositories 301 are used. Further, the functionality may be distributed between the repositories 301 in a different manner than described herein.

The audit and diagnostics repository 401 includes data describing operation of the SCS 110 for record keeping and diagnostic purposes. In one embodiment, the audit and diagnostics repository 401 records and provides documentary evidence of the sequence of activities that have affected, at any given time, a specific operation, procedure, or event. The collected operational data, including operational exceptions, enable later forensic diagnostics of the SCS 110 by systems administrators.

The system configuration repository 403 includes system configuration parameters controlling operation of the SCS 110. Such parameters include, but are not limited to credentials and access configuration to the message distribution system; resource allocation and configuration parameters; and purging, archiving and threshold monitoring parameters.

The entity profile repository 402 maintains profiles of individual users and organizations serviced by the SCS 110. In one embodiment, a profile can correspond to one of two types of entity, an individual user or an organization. In other embodiment, additional and/or different types of entity profiles are used. Regardless of its type, a profile contains certain generic data fields that are pertinent to all types of entity. For example, each profile may contain a unique ID number, a profile name, and at least one mailing address. In addition to the generic data fields, profiles contain additional data fields that depend on the type.

In one embodiment, the profile of an organization 120 in the entity profile repository 402 includes: (a) the organization's name, (b) a type for the organization (e.g., emergency service, information provider, serviced enterprise, etc.), (c) connectivity parameters/authentication credentials for the organization, (d) the types of services provided by the organization, such as whether it accepts incoming duress messages and the templates of reports it can accept from users, (e) the organization's business rules, such as which type and structure of incoming messages from users are accepted, under what conditions incoming messages are accepted, whether the organization accepts anonymous or ad-hoc subscription requests, whether it mandates subscription of its own users, whether it is subscribed to other organizations, whether it allows other organizations to subscribe to its messages, and the like. In other embodiments, the profile of an organization 120 includes different and/or additional information.

In one embodiment, the profile of an individual user in the entity profile repository includes: (a) the user's name, (b) the user's contact details, such as the user's smartphone number, the user's email address, the user's landline number, the user's IP-based telephone number, and/or the user's FACEBOOK™ account, (c) user details, which may be common across organizations, or organization specific, and (d) the user's subscription preferences, such as whether the user wishes to be solicited for subscribing to public safety and weather information based on the user's location. In other embodiments, the profile of a user includes different and/or additional information.

The subscription and associations repository 407 maintains the current subscription and associations amongst entities. In one embodiment, the subscription and associations repository 407 enables the SCS 110 to route information from users' devices (e.g., mobile devices 207) to subscribed organization systems 202, from subscribed organization systems and information publisher systems 201 to users via one or more communication channels 140, from subscribed organization and information publishers 201 to other subscribed organization and from individual users to other individual users. For example, an individual user may be subscribed to multiple organizations such as the local university, his or her workplace, the local police department and an information publisher producing local weather alerts. The user may be defined as an alert publisher as for the user's workplace, a recipient of the local police department and weather alerts, and as both a recipient and an originator of emergency requests to and from the university. The user may also be a sponsor authorizing associates of the user such as members of the user's family to subscribe to and receive alerts from the university. Another example is when police departments in neighboring towns subscribe to information published by other police departments or emergency management systems in their vicinity.

The operational data repository 405 contains records of live and recent notifications sent to users, and other safety-associated information shared by or sent to users, such as the location of medical support teams in a current incident to be shared with users in the affected area. These notifications and shared information are accessible by various users and organizations, dependent on permissions and business rules.

The events repository 406 maintains information about events, including crisis events such as fires, floods, gas leaks, and the like, as created by organizations or by users. In one embodiment, the events repository also stores information about user-initiated events such as duress and other user reports as well as responses to alerts sent to users. The events repository 406 may also maintain event data collected from users on an ongoing basis, such as a user's location, provided the user has given permission for location data to be collected and stored.

Figure 5:
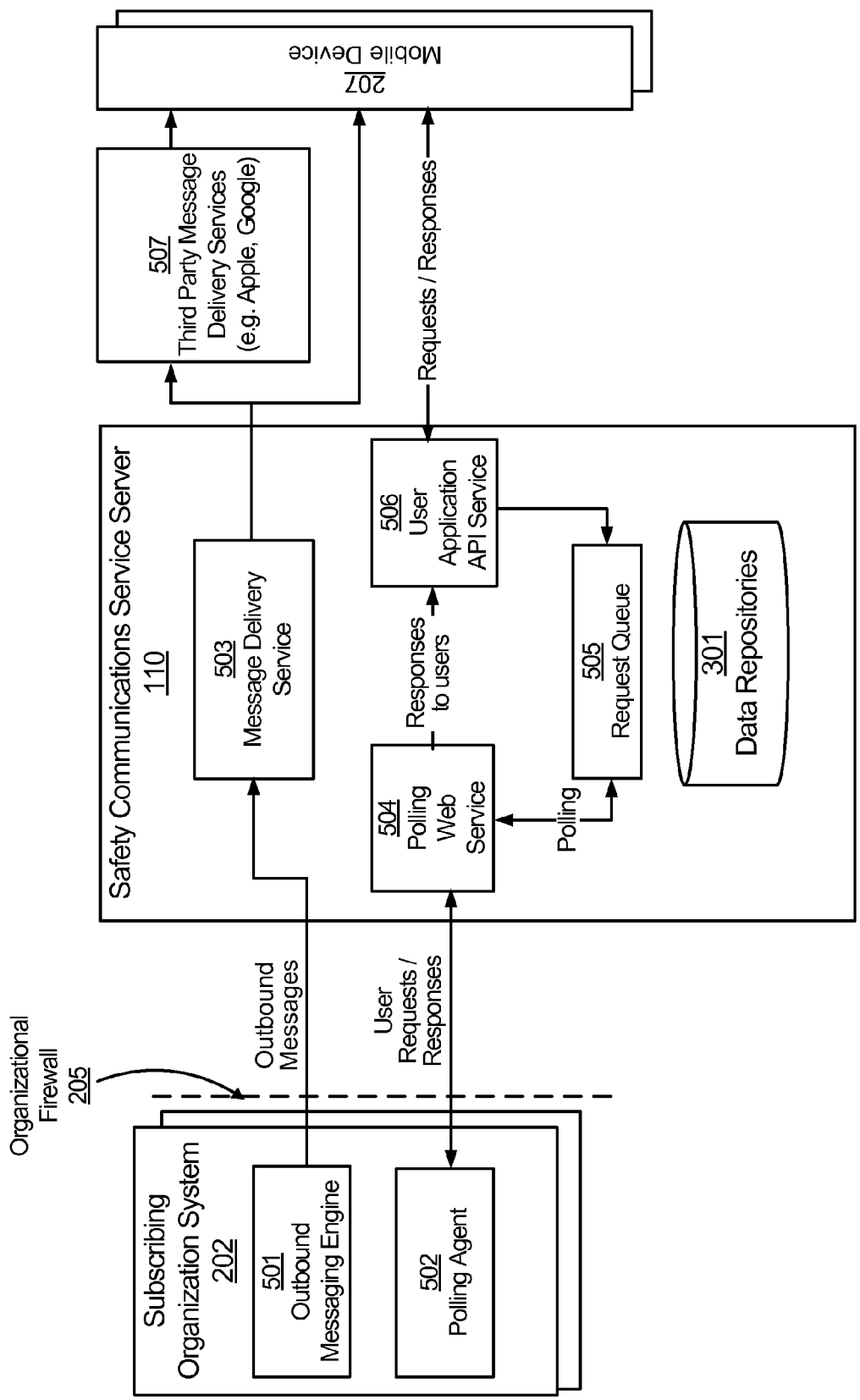
FIG. 5 is a diagram illustrating the operational flow of information between the SCS, organizational systems, and individual users' mobile devices, according to one embodiment.

FIG. 5 illustrates the operational flow of information between the SCS 110, organizational systems 202, and individual users' devices 207, according to one embodiment. Although FIG. 5 illustrates communication to and from users' mobile devices 207, other types of user device may be used, such as landline telephones 208, desktop computers, public safety systems gateways 210, and the like. For clarity, the flow of subscription and configuration information has been omitted from FIG. 5.

In the embodiment illustrated in FIG. 5, the CIE 100 includes a SCS server 110 that (a) delivers outbound messages from one or more organizational systems 202 to one or more users' mobile devices 207 and (b) processes requests from one or more users' mobile devices to one or more organizational systems. In other embodiments, more than one SCS server 110 is used, and load balancing techniques applied to ensure no single SCS server is overwhelmed. Further, the functionality attributed herein to a single SCS server 110 may be distributed across multiple devices. For example, one SCS server 110 may handle delivery of messages to the mobile devices 207 while another handles requests from user devices to organizational systems 202. In a similar manner, another embodiment may use multiple geographically-separated SCS systems to balance load and better serve users.

The delivery of outbound messages is initiated by a module 501 of a subscribed organizational system 202. This module is referred to herein as the Outbound Messaging Engine 501, although in different organizational systems the module may be referred to differently. In one embodiment, the Outbound Messaging Engine 501 is configured to be compliant with the interface requirements of the SCS 110 (e.g., using the SCS API 304 or a dedicated third party plug-in 305). The SCS's Message Delivery Service (MDS) module 503 receives the message originating from the organizational system 202, processes it, and delivers it to the targeted user devices 207 based on targeting information provided by the originating organization and/or subscription data stored in the data repositories 310. The message passes through the organizational firewall 205 unimpeded as it originates inside the firewall and is delivered to the target user's mobile devices 207 either directly (e.g., to a dedicated application) and/or through a third party message delivery service 507, such as the Apple™ Push Notification Service or Google Cloud Messaging™.

User-initiated messages (whether containing information reports or requests) are sent by the mobile devices 207 to the SCS server 110, which processes the messages and forwards them on to the target organizational system or systems 202, as appropriate. In one embodiment, a mobile device 207 sends a message/request to a User Application API Service 506 of the SCS server 110, which validates the message as conforming to the API requirements. The User Application API Service 506 may also confirm that the message is authentic. Once the message has been validated (and authenticated, if authentication is required), the message's content is recorded in the Events Repository 406 and placed in the Request Queue 505. The User Application API service then waits to receive a response from the organizational system 202, and forwards the response from the organizational system to the requesting mobile device 207 once it is received.

In the embodiment illustrated in FIG. 5, the organizational system 202 is behind an organizational firewall 205, and consequently the SCS server 110 cannot initiate a connection with the organizational system in order to deliver the user-initiated message. The Polling Web Service 504 addresses this problem by enabling any subscribed organizational system 202 compliant with the interface requirements of the Polling Web Service to poll the SCS server 110 for user-initiated messages. When the Polling Agent 502 of an Organizational System 202 polls the Polling Web Service 504, the latter identifies a message in the Request Queue 505 intended for the polling system (assuming one exists) and forwards it to the Polling Agent 502. In one embodiment, messages are delivered to an organizational system 202 in the order they are received (i.e., first-in, first-out). In another embodiment, the SCS server 110 arranges messages in the Request Queue 505 by priority. For example, messages indicating a user is under duress may be given high priority and delivered first, with all other requests being delivered only once all pending high priority messages have been successfully delivered.

As the Polling Agent 502 initiated the connection from inside the organizational firewall 205, the Polling Web Service 504 can forward the user-initiated message at this time. In one embodiment, the Polling Agent 502 uses a long-polling technique to establish a persistent connection with the Polling Web Service 504. The long-poll connection remains open until a user-initiated message is received, at which point the connection is closed and a new long-polling connection is opened to listen for the next message while the first message is processed. In another embodiment, the Polling Agent 502 periodically (e.g., once every minute) polls the Polling Web Service 504 for new messages and receives all of the messages relating to the particular organization 120 that are in the Request Queue 505 at that time. One of skill in the art will recognize other connection methods that may be applied in order to securely deliver user-initiated messages without compromising the integrity of the organizational firewall 205.

On receiving a user-initiated message, an organizational system 202 processes the user-initiated message and sends any required response to the Polling Web Service 504, which forwards the response to the User Application API Service 506, which in turn responds to the user's device 140, thus completing the cycle that started with the user's request. This mechanism enables the Organizational System 120 to operate behind their firewalls 205 without compromising their security.

Exemplary Use Cases

Figure 6:
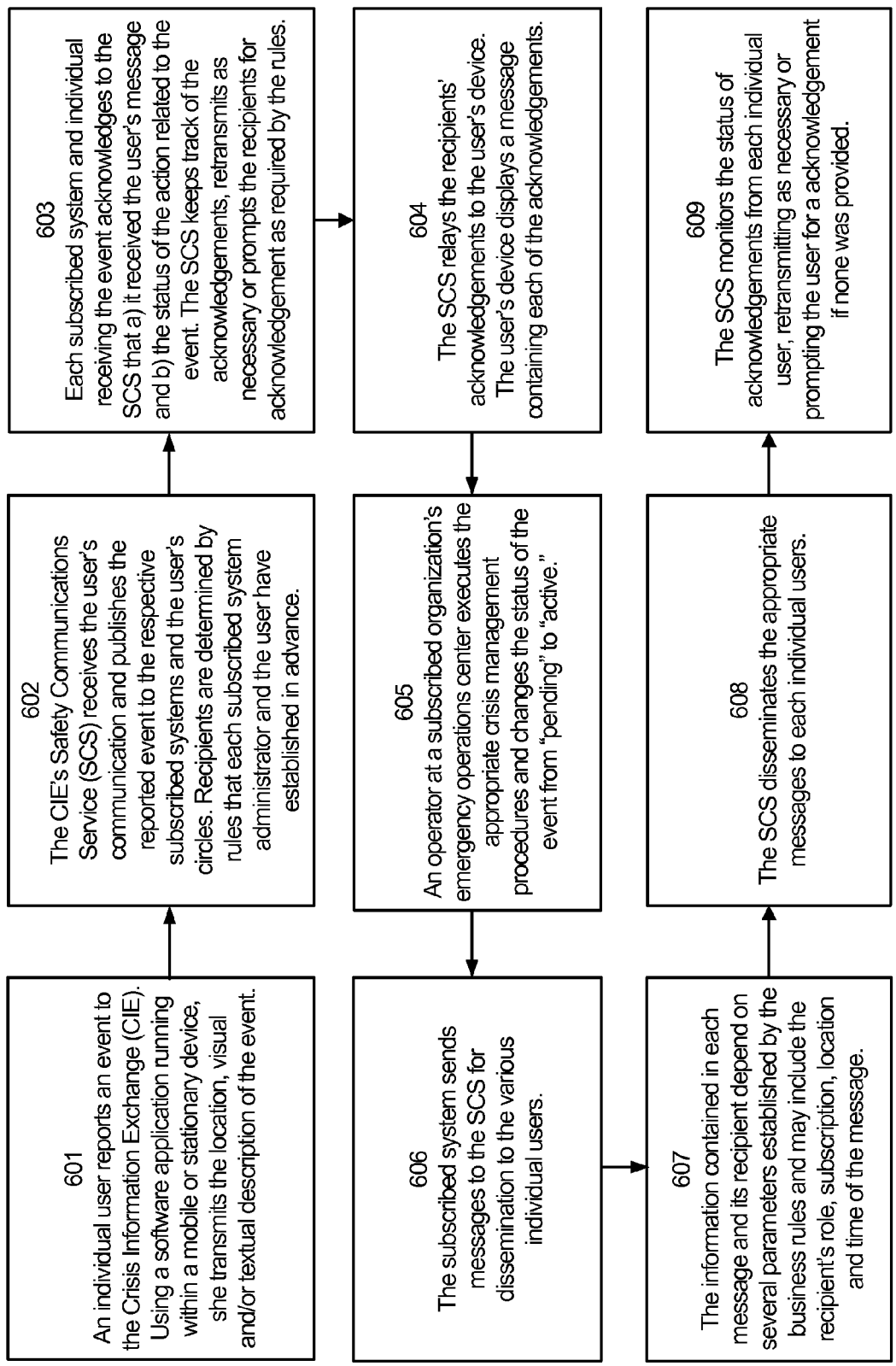
FIG. 6 is a diagram illustrating a general use case of the disclosed system, according to one embodiment.

FIG. 6 illustrates a method for realizing the management of the exchange of crisis-related information amongst individuals and multiple organizations, according to one embodiment. The steps of FIG. 6 are illustrated from the perspective of various components of the CIE 100 performing the method. However, some or all of the steps may be performed by other entities and/or components. In addition, some embodiments may perform the steps in parallel, perform the steps in different orders, or perform different steps.

An individual user reports 601 an event to the CIE 100. Using a software application running within a mobile device 207 (or other user device 208), the user transmits an event report over the Internet 206. In one embodiment, the event report includes the location of the event, visual and/or textual information relating to the event and, optionally, proposed action(s) to be taken. For example, if the event is a large fire in an organization's office building, the event report may identify the room in which the fire is located, include a photograph taken by the user showing the extent of the fire, and recommend that the building be immediately evacuated and emergency services dispatched to the location. In contrast, if the event is a small pan fire in a kitchen, the report may still identify the location and include a picture, but recommend only that the organization's crisis management team be on standby, as the user believes the fire can be safely extinguished with an on-site extinguisher.

On receiving 602 the event report, the CIE's SCS 110 validates the user as authentic and the report as conforming to templates permitted by the relevant organizational recipient(s). The SCS 110 then publishes the reported event to all relevant subscribed organizational systems 202 as well as appropriate ones of the user's associations. Recipients are determined by rules that each subscribed system's administrators and the user have established in advance of the event. The content published may be identical for all organizations and associations, or may be tailored such that each recipient receives the information about the event they require in a compact report. Thus, the recipients' time is not wasted with extraneous information while a crisis event is on-going. For example, in the example of a small kitchen fire used above, the organization's crisis management team and the local fire department may be provided with the location and image of the fire along with a standby recommendation, while the user's family members are each sent a text message saying "fire at work—safe," and the user's colleagues within the building are sent mobile smartphone notifications, phone calls, and/or emails saying "be prepared to evacuate the building."

Each recipient receiving the event report (for which acknowledgment is required) acknowledges 603 to the SCS 110 that (a) the event report was received and (b) the status of the action related to the event. As noted previously, which recipients are required to acknowledge receipt is dependent on the nature of the event being reported and the system configuration 403 settings of the particular deployment. The SCS 110 keeps track of the acknowledgements, retransmits the event report as necessary, and/or prompts the recipients for acknowledgement, as required by the relevant rules.

The SCS 110 relays 604 the recipients' acknowledgements to the user's device (e.g., mobile device 207). Depending on the implementation of the software application, the user's device may display a message containing each of the acknowledgements, identify those recipients that have not yet acknowledged receipt, or use a combination of these approaches.

On receiving 604 the event report, an operator of a subscribed organization system 202 in an emergency operations center executes 605 the appropriate crisis management procedures. For example, if the event is an incoming tornado, the operator may decide to place first responders on standby and establish a security perimeter within which all personnel must seek shelter, while all personnel outside of the perimeter are not to enter the perimeter area. The operator also changes the status of the event from "pending" to "active."

The organization system 202 sends 606 messages to the SCS 110 for dissemination to the various individual users 140. The information contained in each message and its recipient depend on several parameters established by the relevant business rules and may include the recipient's role, subscriptions, and location, as well as the time of the message 607. For example, first responders may be provided with the location and nature of the event, personnel within the security perimeter may be told to find shelter and/or evacuate the area (depending on the nature of the event), and personnel outside of the security perimeter may be instructed to stay away from the area. The SCS 110 disseminates 608 the appropriate messages to each of the individual users.

Once the messages have been sent 606, the SCS 110 monitors 609 the status of acknowledgements from each individual user for which acknowledgement is required. The SCS 110 retransmits the message and/or prompts the users who are yet to acknowledge receipt as necessary. As described previously, in one embodiment, the SCS 110 transmits the message a predetermined number of times before reporting back to the sender that acknowledgment of receipt has not been provided, for follow up and resolution, as applicable. In another embodiment, the SCS may also relay the message to adjacent organizations in the vicinity of the event.

Figure 7:
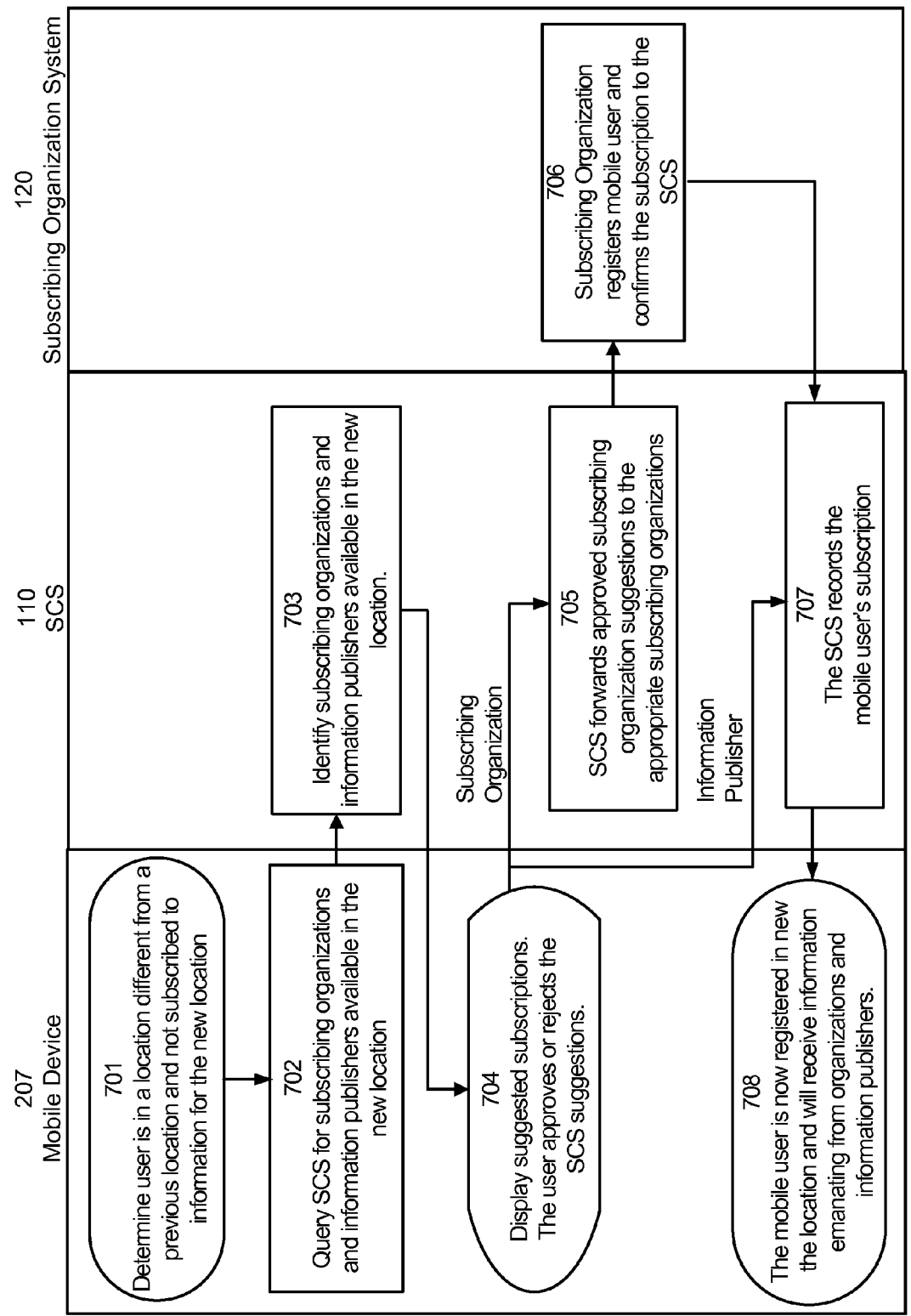
FIG. 7 is a diagram illustrating an exemplary use case of a mobile user subscribing to organizations using the disclosed system's dynamic location features, according to one embodiment.

FIG. 7 illustrates a method for location-based subscription of one or more users, through the SCS 110, to one or more subscribing organizations and/or information publishers, according to one embodiment. The steps of FIG. 7 are illustrated from the perspective of various components of the CIE 100 performing the method. However, some or all of the steps may be performed by other entities and/or components. In addition, some embodiments may perform the steps in parallel, perform the steps in different orders, or perform different steps.

In the embodiment shown in FIG. 7, the method begins with an application (e.g., a dedicated crisis communications application) on the user's mobile device 207 determining 701 that the user is located in a location different from a previous location, and that the user is not yet subscribed to information from this new location. In an alternative embodiment, the SCS 110 determines this condition based on user location data (e.g., GPS data), provided the user has given the SCS permission to track her location. The mobile user's device 207 then queries 702 the SCS 110 for subscribing organizations and/or information publishers available in the new location.

The SCS 110 queries its organization profile repository 402 to identify 703 subscribing organizations and/or information publishers available in the new location. In one embodiment, the SCS 110 checks if the user is eligible to subscribe to the identified organizations and information publishers, and sends one or more message(s) to the user's mobile device 207, recommending the user subscribes to those local organizations and information publishers to which the user is eligible to subscribe. In another embodiment, the SCS 110 provides the user with a list of all possible subscriptions in the local area and checks the user's eligibility to subscribe to a particular organization or information publisher when the user makes a request to subscribe. One of skill in the art will recognize that other methods of identifying subscriptions for a user in a new area that may be used.

The user's mobile device 207 displays the message(s) sent by the SCS 110 indicating possible subscriptions. In one embodiment, the user responds to the SCS's subscription recommendations by approving or rejecting them. In another embodiment, the subscription may be completely automated, such as when the user sets a preference such as "always subscribe me to safety messages around my current location."

If the user is attempting to subscribe to a Subscribing Organization, the SCS 110 forwards 705 the approved subscription requests to the corresponding subscribing organization's computing system 202 (e.g., crisis management system 121). On receiving the subscription request, the subscribing organization's computing system 202 registers the user and confirms the subscription to the SCS 110 by sending a confirmation message. On receiving the confirmation message, the SCS 110 records 707 the user's new subscription in the user-organization subscription repository 407. The user is now registered 708 in the new location and will receive information emanating from organization's system 202.

If the user is attempting to subscribe to an information publisher, the SCS 110 records 707 the user's subscription in the user-organization subscription repository 407. Thus, the user is now registered 708 with the information publisher, and future information received by the SCS 110 from the information publisher's system 201 will be automatically forwarded to the user (e.g., to the user's mobile device 207), subject to additional targeting requirements provided by the information publisher, such as the user being present in a particular geographic region at the time.

Figure 8:
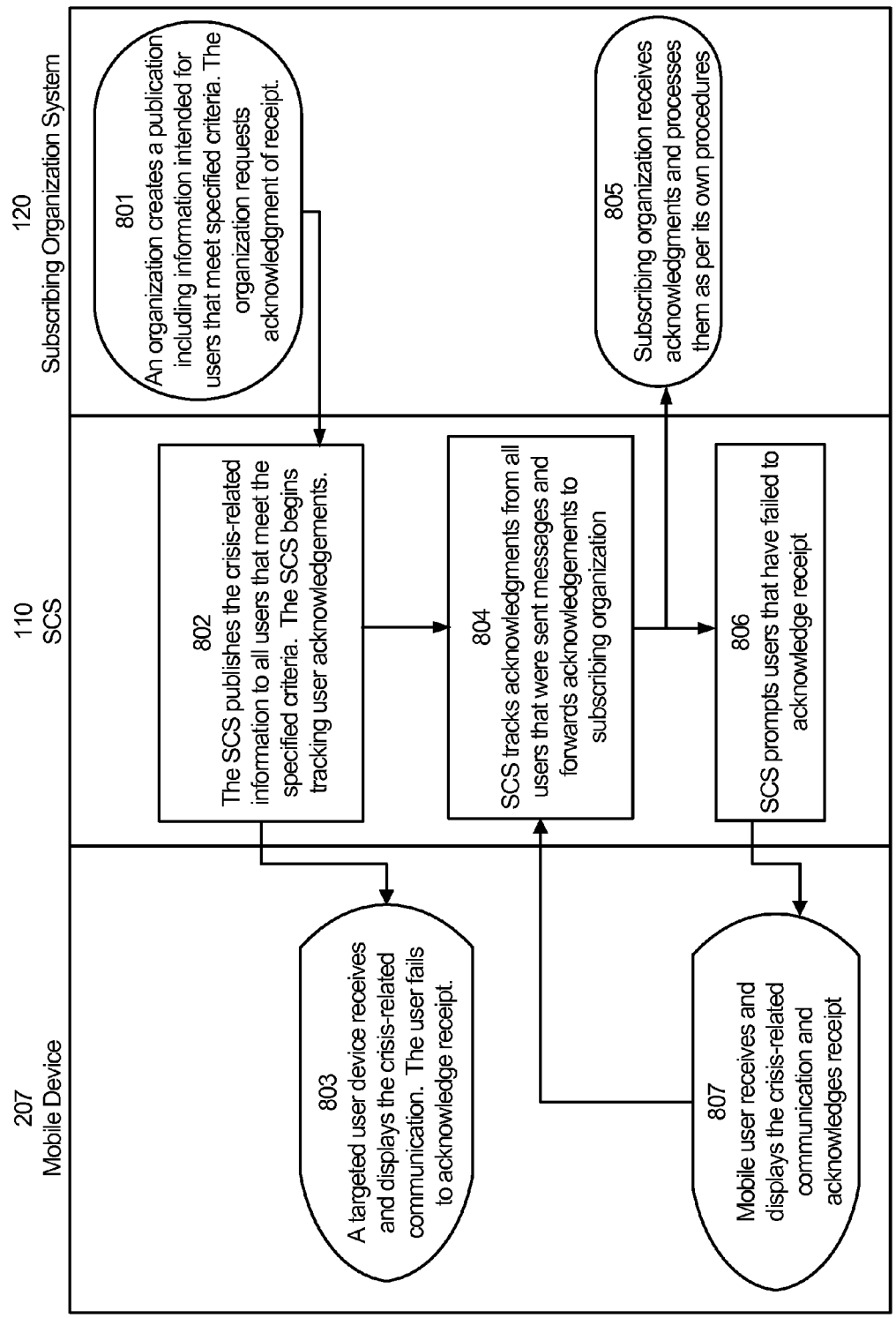
FIG. 8 is a diagram illustrating an exemplary use case in which a subscribing organization notifies subscribed users of an emergency, according to one embodiment.

FIG. 8 illustrates an exemplary use case in which a subscribing organization notifies subscribed users of an emergency, according to one embodiment. The steps of FIG. 8 are illustrated as being performed by various components of the CIE 100. However, some or all of the steps may be performed by other entities and/or components. In addition, some embodiments may perform the steps in parallel, perform the steps in different orders, or perform different steps.

In the embodiment shown in FIG. 8, the notification process begins with a subscribing organization system 202 creating 801 a publication containing crisis-related information intended for users that the meet one or more specified criteria, such as a user's location. Alternatively, the publication can be targeted to specific users by name, role, organizational structure, and the like. In the example illustrated by FIG. 8, the publication includes a request that all users receiving the publication acknowledge receipt, however, in other instances, depending on the type of the information/message included in the publication, such acknowledgment may not be requested. Once created 801, the organization system 202 forwards the publication to the SCS 110 for distribution.

On receiving the publication, the SCS 110 publishes 802 the crisis-related information contained therein to all registered users that meet the specified criteria and/or users that subscribe to the organization. In one embodiment, the SCS 110 begins tracking 804 user acknowledgements. The SCS 110 forwards acknowledgments received from users' devices (e.g., mobile devices 207) to the subscribing organization system 202, which processes the acknowledgments as per the organization's own procedures. In other embodiments, such as broadcasts of severe weather information to subscribed users, the SCS 110 does not track user acknowledgements.

At 803, a targeted mobile device 207 receives the publication, but the corresponding user fails to acknowledge receipt. In one embodiment, the SCS 110 sends 806 a prompt to the mobile device 207 of the user that failed to acknowledge receipt as a reminder to provide such acknowledgement. Alternatively, the message containing the published information may be resent to the user's mobile device 207.

At 807, the user acknowledges receipt of the published information and the user's mobile device 207 sends a notification to the SCS 110. The SCS 110 forwards the acknowledgement notification to the subscribing organization system 120 from which the publication originated.

Figure 9:
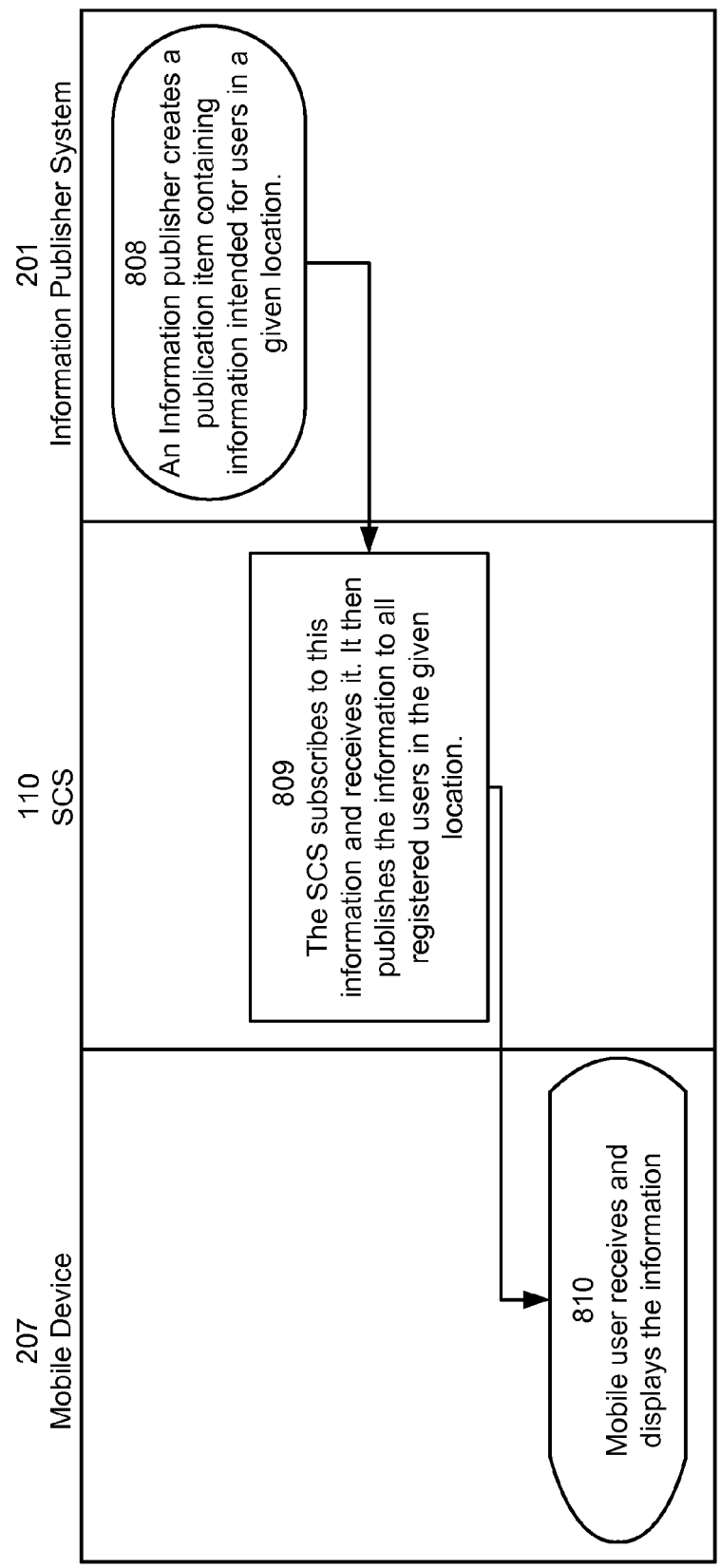
FIG. 9 is a diagram illustrating an exemplary use case in which an information publisher publishes crisis-related information through the SCS, according to one embodiment.

FIG. 9 illustrates an exemplary use case in which an information publisher system 201 publishes crisis-related information through the SCS 110, according to one embodiment. The steps of FIG. 9 are illustrated as being performed by various components of the CIE 100. However, some or all of the steps may be performed by other entities and/or components. In addition, some embodiments may perform the steps in parallel, perform the steps in different orders, or perform different steps.

In the embodiment shown in FIG. 9, the publication process begins with an information publisher system 201 such as one operated by the National Weather Service creating 808 a publication item including information intended for users in a given location. The SCS 110 having already subscribed to the information publisher receives 809 the publication, and publishes the information to all registered users in the given location. The mobile devices 207 of subscribed users at the location receive and display 810 the information.

Figure 10:
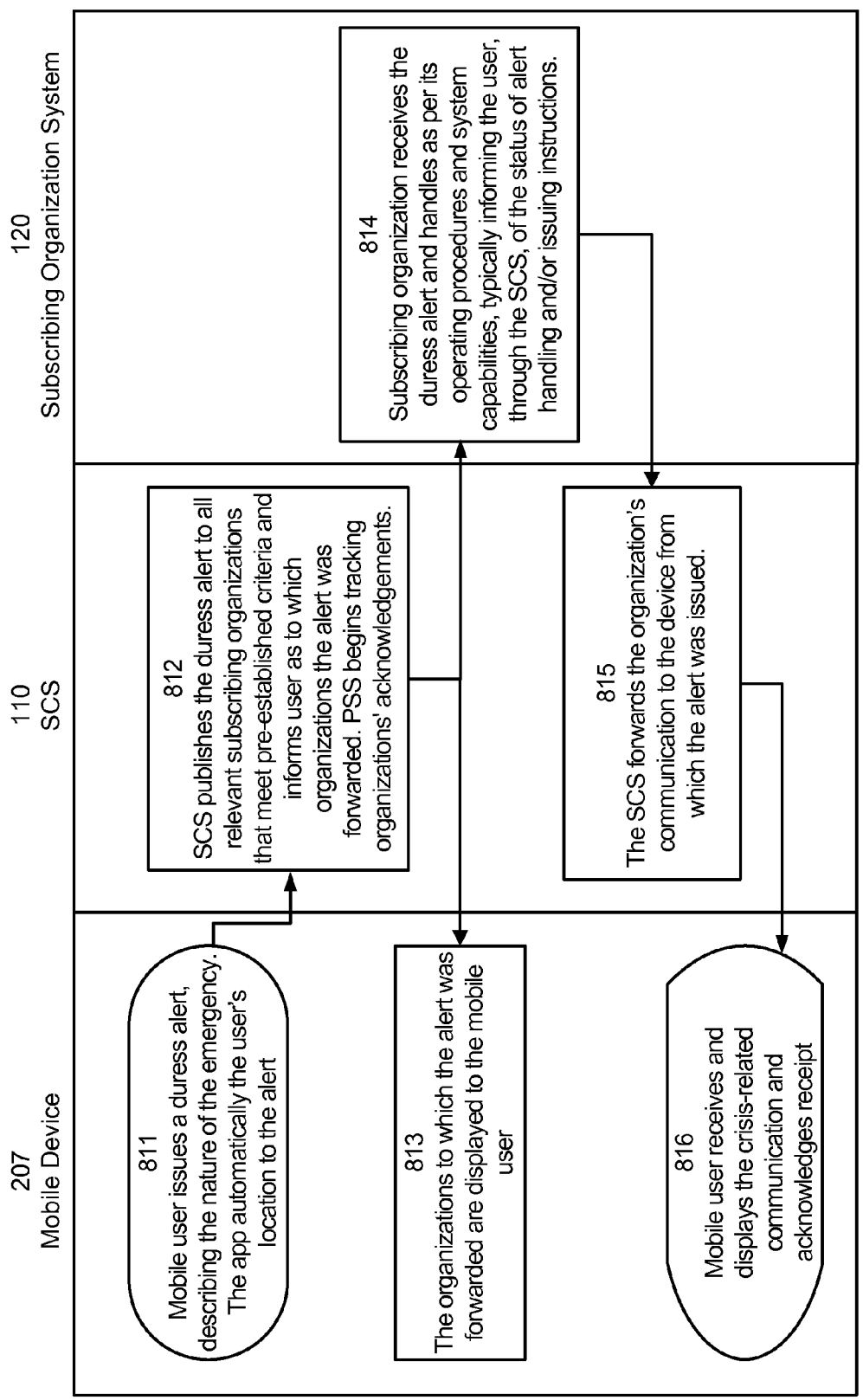
FIG. 10 is a diagram illustrating an exemplary use case in which a mobile user issues a duress alert while experiencing a crisis situation, according to one embodiment.

FIG. 10 is a diagram illustrating an exemplary use case in which a user issues a duress alert using a mobile device 207 while experiencing a crisis situation, according to one embodiment. The steps of FIG. 10 are illustrated as being performed by various components of the CIE 100. However, some or all of the steps may be performed by other entities and/or components. In addition, some embodiments may perform the steps in parallel, perform the steps in different orders, or perform different steps.

In the embodiment shown in FIG. 10, a mobile user issues a duress alert 811 describing the nature of the emergency using an app on a smart phone 207. The mobile app automatically adds the user's location to the duress alert and forwards it to the SCS 110. On receiving 812 the duress alert, the SCS 110 publishes it to all subscribing organizations that meet the pre-established criteria to receive such alerts. For example, if the user's location is within a subscribing organization's established area of responsibility, and within designated time frames (such as working days only), the SCS 110 sends the duress alert to a organizational system 202 operated by the subscribing organization. In one embodiment, the SCS 110 begins tracking organizations' acknowledgements. In another embodiment, the SCS 110 sends 813 notifications of which organizations have been forwarded the duress alert to the user's smart phone 207 for display in the app.

The subscribing organizations' systems 202 receive 814 the duress alert and handle it as per their individual operating procedures and system capabilities. In one embodiment, the subscribing organizations' systems 202 send messages to the user's smart phone 207 indicating the status of alert handling and/or issuing instructions to the user regarding how to react to the emergency. These messages from the subscribing organizations' systems 202 to the user's mobile device 207 are routed via the SCS 110. On receiving and displaying 816 the crisis-related communications, the user's mobile device 207 acknowledges receipt to the SCS 110, which in turn forwards the acknowledgements to the corresponding subscribing organizations' systems 202.

Exemplary Scenario

Figure 11A:
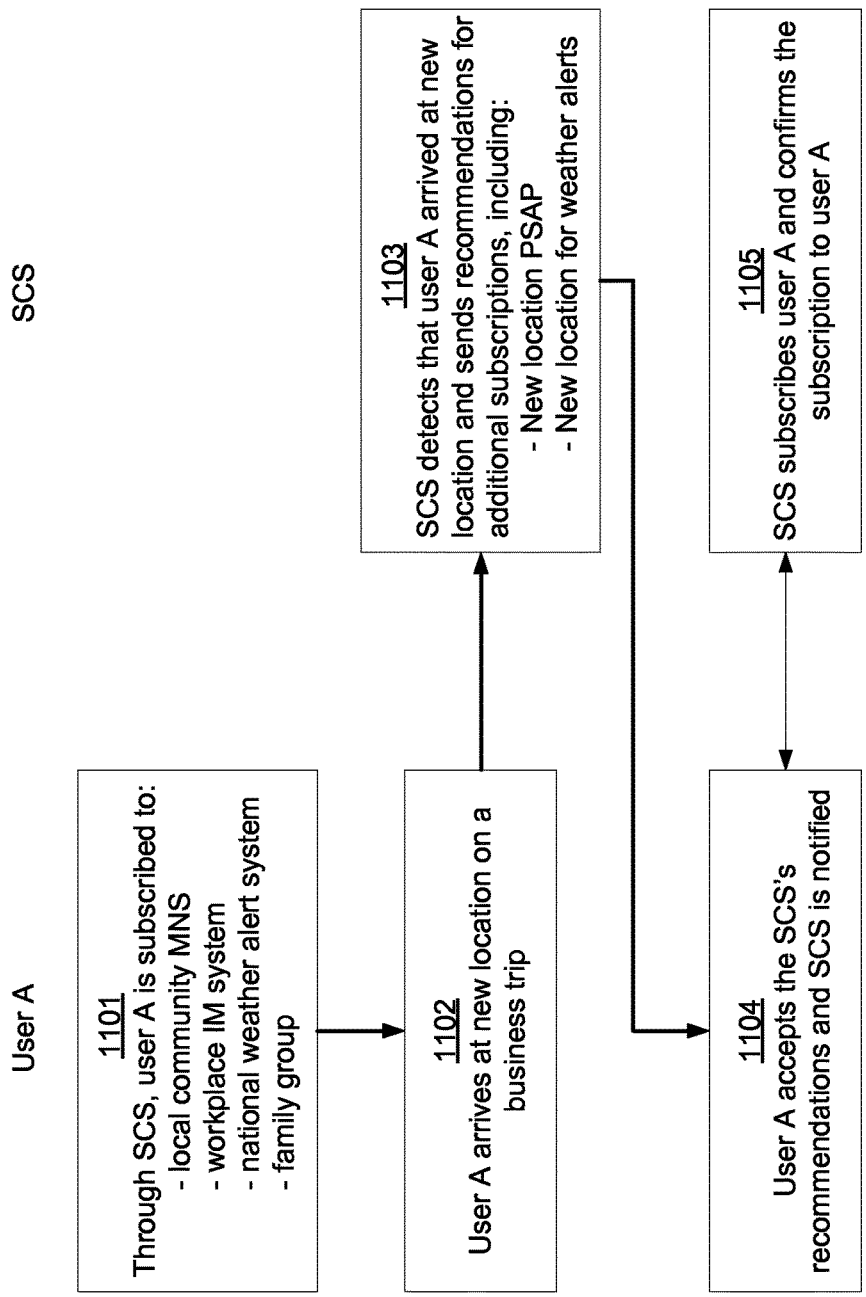
Figure 11B:
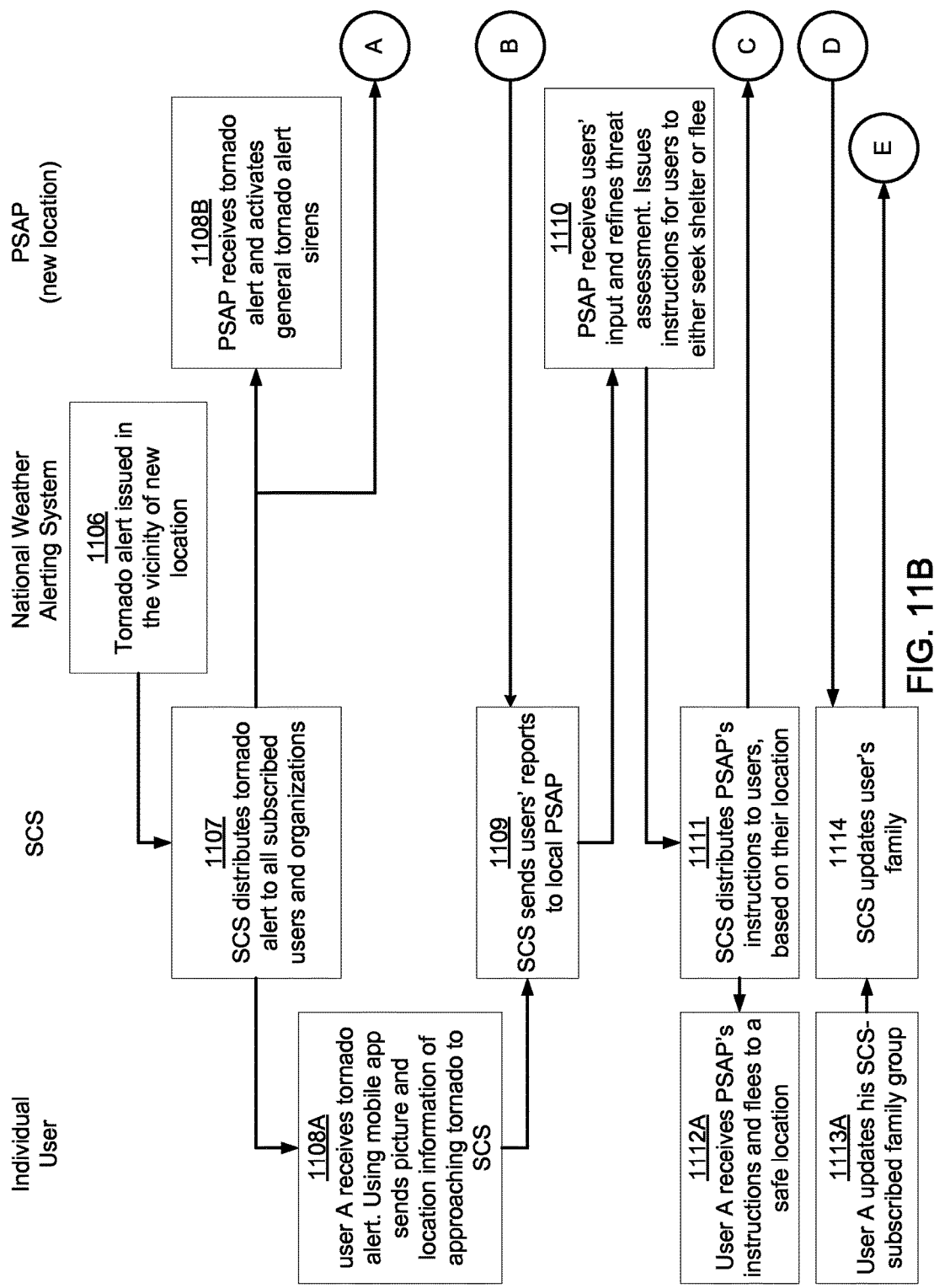

The following comprehensive exemplary use case illustrated by FIGS. 11A-C explains how the components identified above can interact to provide an exchange of crisis-related information amongst multiple individuals and multiple organizations during a tornado event, in accordance with one embodiment.

Referring first to FIG. 11A, an individual user is subscribed 1101, through the SCS 110, to her local community mass notification system, her workplace instant messaging and notification system, and the National Weather Service alerting system. She is also a member of an association of individuals, primarily consisting of members of her family, registered in the SCS 110 as a group that can exchange structured messages with each other in cases of emergency.

The individual user travels to an area located away from her home location 1102. Upon arrival at the new location, the PSMA running on her mobile device 207 communicates with the SCS 110. The SCS 110 detects 1103 that she is now located in a location different from her home location and provides recommendations to the user's mobile device 207 for additional subscriptions that may be relevant to her in the new location. In this case, the recommendations include a link to the local PSAP and updating her location of her subscription to the National Weather Service.

The user's mobile device 207 presents the recommendations to the user, and she accepts 1104 the SCS's recommendations. The PSMA on the user's mobile device 207 notifies the SCS 110, which in turn subscribes 1105 here to the recommended organizations and confirms the new subscriptions by sending acknowledgement messages to the PSMA on her mobile device.

Turning now to FIG. 11B, at some time after the user has subscribed to the recommended organizations, the National Weather Alerting Service issues 1106 a tornado alert for the counties in the vicinity of the user's location. The SCS 110 receives the alert and distributes 1107 it to all subscribed users and organizations, including the user and a local PSAP.

The local PSAP receives the National Weather Service tornado alert from the SCS 110 and, based on the information contained in the alert, the local PSAP operator 1108B activates the community alerting sirens located in the path of the tornado.

The user also receives 1108A the tornado alert. She observes the tornado in the distance but determines that it does not seem to be heading in her direction. Using the PSMA on her smart phone 207, she takes a picture of the tornado and sends the picture, along with her observation, to the SCS 110. On receiving the picture and observation from the user, the SCS 110 forwards them to the local PSAP to assist in coordination of the emergency services' response.

Referring now to FIG. 11C, all other subscribed SCS users and organizations in the path of the tornado also receive 1108C the tornado alert. Several individual users snap pictures of the approaching tornado and using their PSMAs send pictures and comments through the SCS 110 to the local PSAP. Each of their transmissions automatically includes location and time information for the images and comments.

Referring back to FIG. 11B, the SCS 110 forwards 1109 all users' reports to the local PSA. The PSAP receives 1110 the users' input and refines its threat assessment. The PSAP then formulates updated instructions to all SCS-subscribed users located in the vicinity of the tornado to either flee the path of the tornado or shelter in place, depending on their location. The PSAP also issues appropriate instructions to first responders' systems and workplace instant messaging and notification systems for further dissemination though their systems. The SCS 110 disseminates 1011 the PSAP's instructions to all SCS-subscribed users and organizational systems, based on their location.

Referring to both FIG. 11A and FIG. 11B, the individual users receive (1112A and 1112B) the PSAP's instructions and act as directed. They continue to report their observations of the tornado's progress using their PSMA. First responders also receive 1112C the PSAP's information and act accordingly. Workplace instant messaging and notification systems also receive 1112D the PSAP's information and disseminate their own instructions to their users, such as instructing workers to move to a shelter at the workplace, or not come into work.

Individual users enter updates for their subscribed family groups (1113A and 1113B) into the PSMA in order to keep them informed of their status. The SCS 110 receives 1114 the updates from the individual users and disseminates them 1115 to the appropriate family groups, as indicated by the subscription data stored in the SCS repositories 301.

Computing Machine Architecture

Figure 12:
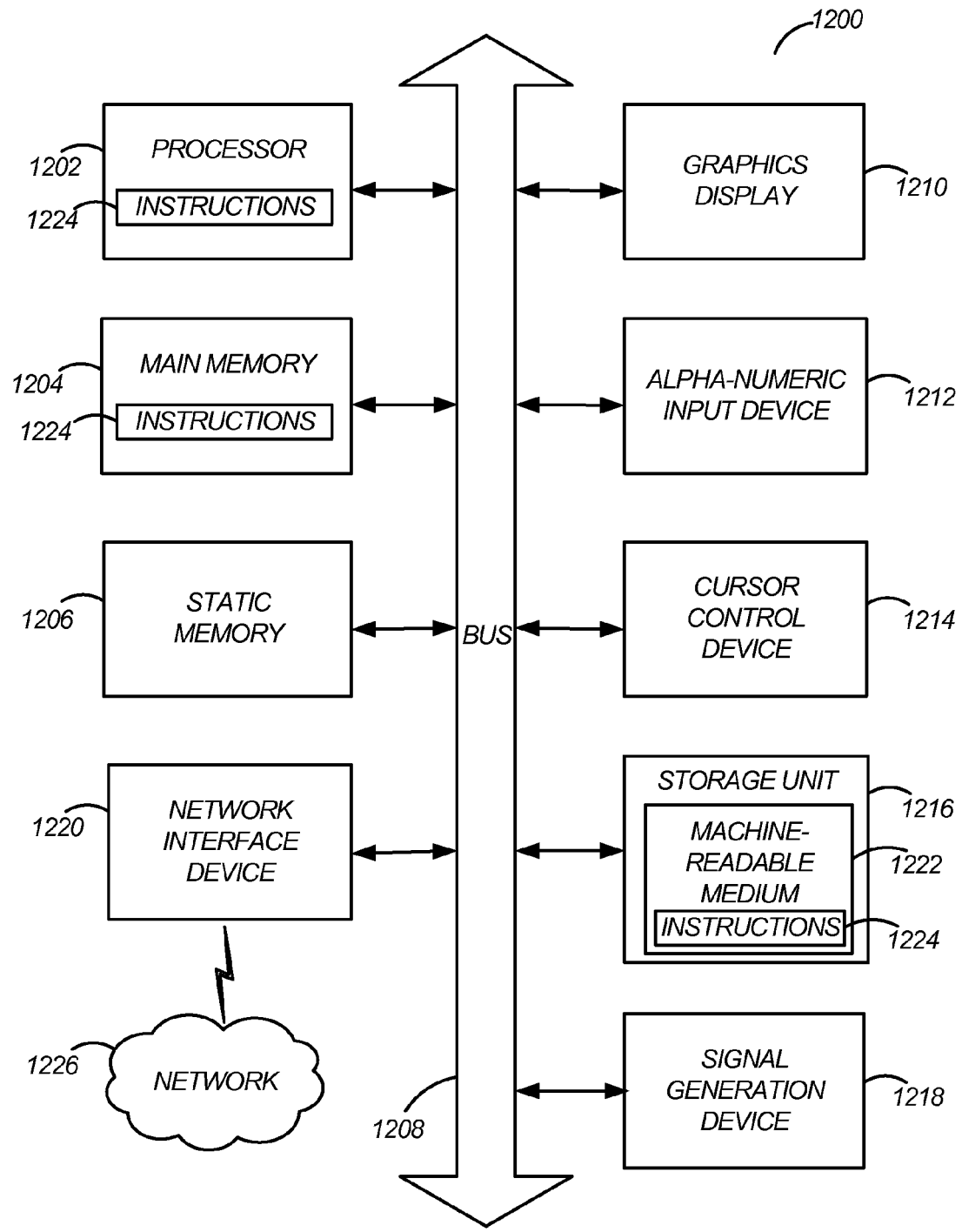
FIG. 12 illustrates one embodiment of components of an example machine able to read instructions from a machine-readable medium and execute them in a processor (or controller).

This disclosure describes numerous process embodiments and examples. These processes may be embodied as logical operations or program code instructions. The instructions may be stored and executed by a machine. FIG. 12 is a block diagram illustrating components of an example machine able to read instructions from a machine-readable medium and execute them in a processor (or controller). Specifically, FIG. 12 shows a diagrammatic representation of a machine in the example form of a computer system 1200 within which instructions 1224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that specify actions to be taken by that machine. Further, while only a single machine is illustrated, the term "machine" shall also be taken to include any collection of machines that individually or jointly execute instructions 1224 to perform any one or more of the methodologies discussed herein.

The example computer system 1200 includes a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which are configured to communicate with each other via a bus 1208. The computer system 1200 may further include graphics display unit 1210 (e.g., a plasma display panel (PDP), a liquid crystal display (LCD), a projector, or a cathode ray tube (CRT)). The computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which also are configured to communicate via the bus 1208.

The storage unit 1216 includes a machine-readable medium 1222 on which is stored instructions 1224 (e.g., software) embodying any one or more of the methodologies or functions described herein. The instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., instructions 1224) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Embodiments of the systems and processes described above provide advantages over existing systems for the management of crisis-related communications. For example, embodiments enable crisis-related communications to be delivered to users regardless of whether or not these users are members of the originating organization. Further, a user can send and receive all crisis-related communications using a single application on a mobile device (rather than multiple proprietary applications that are each capable of only communicating with a single system). Additional advantages include providing structured communications that reduce the likelihood of inaccurate information being disseminated, providing flexible subscription policies such that subscribing organizations can select their own policies, and facilitating the exchange of information amongst multiple organizations' crisis management systems without compromising the data security of the organizations' private networks.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing crisis communications management through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A safety communications service (SCS) for managing crisis-related communications amongst a plurality of entities, the SCS comprising:
   a repository configured to store data regarding entities and indicating relationships between entities, each relationship comprising an indication of a first entity, an indication of a second entity, an indication of whether the first entity is available to receive information from the second entity, an indication of whether the second entity is available to receive information from the first entity, and additional information describing the relationship between the first and second entities;
   an entity interface configured to receive, from devices of a plurality of originating entities, crisis-related information items, each crisis-related information item including metadata and information;
   a business logic subsystem, operatively connected to the repository and to the entity interface, configured to analyze information items to determine whether the information items include certain metadata attributes, the metadata attributes including: an originating entity's identity, an originating entity's geographical location, one or more geographical locations corresponding to the information item, a time the information item was originated, an urgency of the information item, a type of the information item, and one or more groups of specified recipient entities, the business logic subsystem further configured to identify, for each information item, a corresponding set of recipient entities based on the metadata attributes determined to be included in that information item and the relationships stored in the repository;
   a message delivery subsystem, operably connected to the business logic subsystem, configured to compose, for a given information item, a new message associated with the given information item, and transmit the new message to the corresponding set of recipient entities using one or more telecommunication networks, the message delivery subsystem further configured to:
      determine that a firewall is between the SCS and a particular recipient entity in the corresponding set of recipient entities;
      in response to determining that the firewall is between the SCS and the particular recipient entity, establish a connection with the particular recipient entity responsive to receiving a polling request from the particular recipient entity; and
      transmit the new message to the particular recipient entity through the established connection; and
   a relationship generation subsystem configured to:
      determine that the first entity has entered a new location;
      identify, by a hardware processor, at least one other entity relevant to the new location as a candidate for being related to the first entity; and
      generate, by the hardware processor, a relationship between the first entity and the candidate.

2. The SCS of claim 1, wherein the new message includes at least a portion of the information included in the given information item.

3. The SCS of claim 1, wherein the message delivery subsystem distributes the new message by performing processes including:
   adding the new message to a queue, the queue comprising an ordered list of messages to be delivered to a computing device of a recipient entity;
   establishing a connection with the computer system of the recipient entity responsive to receiving a connection request from the computer system of the recipient entity; and
   delivering a first message in the ordered list of messages to the computing system of the recipient entity.

4. The SCS of claim 3, wherein a position at which the new message is added to the ordered list of messages is based on a priority of the new message relative to other messages in the list.

5. The SCS of claim 1, wherein a candidate recipient is included in the set of recipient entities for a given information item based on one or more business rules, the one or more business rules relating one or more of: the originating entity's identity, the candidate recipient entity's identity, the candidate recipient entity's affiliation with one or more groups, a relationship between the originating entity and the candidate recipient entity, explicit groups of recipient entities specified within the given information item, the one or more geographical locations corresponding to the given information item, the originating entity's location, the candidate recipient entity's location, the candidate recipient entity's locations of interest, the candidate recipient entity's availability, the type of the given information item, the urgency of the information item and the sensitivity of the information item.

6. The SCS of claim 1, further comprising:
   a relationship generation subsystem configured to automatically compare data relating to a first entity with a profile of a second entity to determine a correspondence therebetween, the relationship generation subsystem further configured to store, in the repository, a relationship between the first entity and the second entity responsive to the correspondence.

7. The SCS of claim 1, further comprising:
   a relationship generation subsystem configured to automatically relate entities associated with a first entity to the first entity, the relationship generation subsystem further configured to send a message to entities associated with a second entity, the message comprising a notification that the entities associated with the second entity are eligible to receive information items from the second entity.

8. The SCS of claim 1, further comprising:
   a relationship generation subsystem configured to compare a profile of a first entity to a profile of a second entity to determine a correspondence therebetween, the relationship generation subsystem further configured to identify a candidate entity related to the first entity and generate a suggestion that the second entity also relates to the candidate entity, based on the correspondence between the first and second entities.

9. The SCS of claim 1, wherein the data regarding entities comprises composite entity profiles, each composite entity profile comprising at least one common attribute and at least one relationship-specific attribute.

10. A method of managing crisis-related communications amongst a plurality of entities, the method comprising:
   storing, in a repository, data regarding entities and indicating relationships between entities, each relationship comprising an indication of a first entity, an indication of a second entity, an indication of whether the first entity is available to receive information from the second entity, an indication of whether the second entity is available to receive information from the first entity, and additional information describing the relationship between the first and second entities;

29 determining that the first entity has entered a new location;

identifying, by a hardware processor, at least one other entity relevant to the new location as a candidate for being related to the first entity;

generating, by a hardware processor, a relationship between the first entity and the candidate;

receiving, from devices of a plurality of originating entities, crisis-related information items, each crisis-related information item including metadata and information;

analyzing information items to determine whether the information items include certain metadata attributes, the metadata attributes including: an originating entity's identity, an originating entity's geographical location, one or more geographical locations corresponding to the information item, a time the information item was originated, an urgency of the information item, a type of the information item, and one or more groups of specified recipient entities;

identifying, for each information item, a corresponding set of recipient entities based on the metadata attributes determined to be included in that information item and the relationships stored in the repository;

determining that a firewall is between the SCS and a particular recipient entity in the corresponding set of recipient entities;

in response to determining that the firewall is between the SCS and the particular recipient entity, establishing a connection with the particular recipient entity responsive to receiving a polling request from the particular recipient entity;

composing, for a given information item, a new message associated with the given information item; and transmitting the new message to the corresponding set of recipient entities using one or more telecommunication networks, wherein the new message is transmitted to the particular recipient entity through the established connection.

11. The method of claim 10, wherein the new message includes at least a portion of the information included in the given information item.

12. The method of claim 11, wherein distributing the new message comprises:

adding the new message to a queue, the queue comprising an ordered list of messages to be delivered to a device of a recipient entity, the new message added at a position based on a priority of the new message relative to other messages in the list;

establishing a connection with the device of the recipient entity responsive to receiving a connection request from the device of the recipient entity; and delivering a first message in the ordered list of messages to the device of the recipient entity.

13. The method of claim 10, wherein a candidate recipient is included in the set of recipient entities for a given information item based on one or more business rules, the one or more business rules relating one or more of: the originating entity's identity, the candidate recipient entity's identity, the candidate recipient entity's affiliation with one or more groups, a relationship between the originating entity and the candidate recipient entity, explicit groups of recipient entities specified within the given information item, the one or more geographical locations corresponding to the given information item, the originating entity's location, the candidate recipient entity's location, the candidate recipient entity's locations of interest, the candidate recipient entity's

30 availability, the type of the given information item, the urgency of the information item and the sensitivity of the information item.

14. The method of claim 10, further comprising:

automatically comparing data relating to a first entity with a profile of a second entity to determine a correspondence therebetween; and storing, in the repository, a relationship between the first entity and the second entity responsive to the correspondence.

15. The method of claim 10, further comprising:

automatically relating entities associated with a first entity to the first entity; and sending a message to entities associated with a second entity, the message comprising a notification that the entities associated with the second entity are eligible to receive information items from the second entity.

16. The method of claim 10, further comprising:

comparing a profile of a first entity to a profile of a second entity to determine a correspondence therebetween;

identifying a candidate entity related to the first entity; and generating a suggestion that the second entity also relates to the candidate entity, based on the correspondence between the first and second entities.

17. The method of claim 10, wherein the data regarding entities comprises composite entity profiles, each composite entity profile comprising at least one common attribute and at least one relationship-specific attribute.

18. A non-transitory computer-readable storage medium storing executable computer program instructions for providing personnel crisis communications management, the computer program instructions when executed causes one or more computing systems to:

store, in a repository, data regarding entities and indicating relationships between entities, each relationship comprising an indication of a first entity, an indication of a second entity, an indication of whether the first entity is available to receive information from the second entity, an indication of whether the second entity is available to receive information from the first entity, and additional information describing the relationship between the first and second entities;

receive, from devices of a plurality of originating entities, crisis-related information items, each crisis-related information item including metadata and information;

determine that the first entity has entered a new location;

identify at least one other entity relevant to the new location as a candidate for being related to the first entity;

generate a relationship between the first entity and the candidate;

analyze information items to determine whether the information items include certain metadata attributes, the metadata attributes including: an originating entity's identity, an originating entity's geographical location, one or more geographical locations corresponding to the information item, a time the information item was originated, an urgency of the information item, a type of the information item, and one or more groups of specified recipient entities;

identify, for each information item, a corresponding set of recipient entities based on the metadata attributes determined to be included in that information item and the relationships stored in the repository;

determine that a firewall is between the SCS and a particular recipient entity in the corresponding set of recipient entities;

in response to determining that the firewall is between the SCS and the particular recipient entity, establish a connection with the particular recipient entity responsive to receiving a polling request from the particular recipient entity;

compose, for a given information item, a new message associated with the given information item; and transmit the new message to the corresponding set of recipient entities using one or more telecommunication networks, wherein the new message is transmitted to the particular recipient entity through the established connection.

19. The non-transitory computer-readable storage medium of claim 18, wherein the new message includes at least a portion of the information included in the given information item.

20. The non-transitory computer-readable storage medium of claim 19, wherein distribute the new message comprises:

add the new message to a queue, the queue comprising an ordered list of messages to be delivered to a device of a recipient entity, the new message added at a position based on a priority of the new message relative to other messages in the list;

establish a connection with the device of the recipient entity responsive to receiving a connection request from the device of the recipient entity; and deliver a first message in the ordered list of messages to the device of the recipient entity.

21. The non-transitory computer-readable storage medium of claim 18, wherein a candidate recipient is included in the set of recipient entities for a given information item based on one or more business rules, the one or more business rules relating one or more of: the originating entity's identity, the candidate recipient entity's identity, the candidate recipient entity's affiliation with one or more groups, a relationship between the originating entity and the candidate recipient entity, explicit groups of recipient entities specified within the given information item, the one or more geographical locations corresponding to the given information item, the originating entity's location, the candidate recipient entity's location, the candidate recipient entity's locations of interest, the candidate recipient entity's availability, the type of the given information item, the urgency of the information item and the sensitivity of the information item.

22. The non-transitory computer-readable storage medium of claim 18, further comprising computer program instructions that causes one or more computing systems to:

automatically compare data relating to a first entity with a profile of a second entity to determine a correspondence therebetween; and store, in the repository, a relationship between the first entity and the second entity responsive to the correspondence.

23. The non-transitory computer-readable storage medium of claim 18, further comprising computer program instructions that causes one or more computing systems to:

automatically relate entities associated with a first entity to the first entity; and send a message to entities associated with a second entity, the message comprising a notification that the entities associated with the second entity are eligible to receive information items from the second entity.

24. The non-transitory computer-readable storage medium of claim 18, further comprising computer program instructions that causes one or more computing systems to:

compare a profile of a first entity to a profile of a second entity to determine a correspondence therebetween;

identify a candidate entity related to the first entity; and generate a suggestion that the second entity also relates to the candidate entity, based on the correspondence between the first and second entities.

25. The non-transitory computer-readable storage medium of claim 18, wherein the data regarding entities comprises composite entity profiles, each composite entity profile comprising at least one common attribute and at least one relationship-specific attribute.

* * * * *

UNITED STATES PATENT AND TRADEMARK OFFICE
CERTIFICATE OF CORRECTION

| | | |
|---|---|---|
| PATENT NO. | : 9,805,430 B2 | Page 1 of 1 |
| APPLICATION NO. | : 14/541073 | |
| DATED | : October 31, 2017 | |
| INVENTOR(S) | : Guy Shlomo Miasnik et al. | |

It is certified that error appears in the above-identified patent and that said Letters Patent is hereby corrected as shown below:

In the Claims

Column 27, Line 25, In Claim 1, delete "a time the information item" and insert -- time the information item --, therefor.

Column 29, Line 17, In Claim 10, delete "a time the information item" and insert -- time the information item --, therefor.

Column 30, Line 33, In Claim 18, delete "personnel crisis communications" and insert -- personal crisis communications --, therefor.

Signed and Sealed this
Twenty-fourth Day of April, 2018

Andrei Iancu
*Director of the United States Patent and Trademark Office*